(12) United States Patent
O'Farrell et al.

(10) Patent No.: US 8,214,409 B2
(45) Date of Patent: Jul. 3, 2012

(54) ADAPTER ARCHITECTURE FOR MOBILE DATA SYSTEM

(75) Inventors: Robert O'Farrell, Woodinville, WA (US); Mark Kirstein, Incline, NV (US)

(73) Assignee: Antenna Dexterra, Inc., Wilmington, DE (US)

( * ) Notice: Subject to any disclaimer, the term of this patent is extended or adjusted under 35 U.S.C. 154(b) by 0 days.

(21) Appl. No.: 13/017,912

(22) Filed: Jan. 31, 2011

(65) Prior Publication Data

US 2011/0295868 A1 Dec. 1, 2011

(51) Int. Cl.
*G06F 17/30* (2006.01)
(52) U.S. Cl. ........................... 707/802; 709/203
(58) Field of Classification Search .................. 707/802, 707/803, 805, 756, 955; 709/203; 705/1.1, 705/7.11
See application file for complete search history.

(56) References Cited

U.S. PATENT DOCUMENTS

| | | | |
|---|---|---|---|
| 2005/0005259 A1* | 1/2005 | Avery et al. | 717/103 |
| 2006/0031775 A1* | 2/2006 | Sattler et al. | 715/769 |
| 2007/0157192 A1* | 7/2007 | Hoefler et al. | 717/168 |

\* cited by examiner

*Primary Examiner* — Cheryl Lewis
(74) *Attorney, Agent, or Firm* — Paul J. Sutton; Claude R. Narcisse

(57) ABSTRACT

A data architecture provides View objects that define an enterprise data source interface to an application through connectors, and also by Data Objects defined by Commands. Thus, a Data Object comprises a configurable request for data that is issued through Commands to the Adapters of the enterprise data sources. The architecture provides an application developer with the ability to create custom enterprise connectivity to disparate backend enterprise data sources.

7 Claims, 18 Drawing Sheets

FIG. 16

ADAPTER ARCHITECTURE FOR MOBILE DATA SYSTEM

REFERENCE TO PRIORITY DOCUMENTS

This application claims benefit of priority of: U.S. Provisional Patent Application Ser. No. 60/664,121 entitled "Data Management for Mobile Data System", by Robert O'Farrell et al., filed Mar. 21, 2005; U.S. Provisional Patent Application Ser. No. 60/664,088 entitled "Modular Applications for Mobile Data System", by Robert Loughan, filed Mar. 21, 2005; U.S. Provisional Patent Application Ser. No. 60/664,122 entitled "Adapter Architecture for Mobile Data System", by Robert O'Farrell et al., filed Mar. 21, 2005; and U.S. Provisional Patent Application Ser. No. 60/667,816 entitled "Modular Applications Management for Mobile Data System", by Robert O'Farrell et al., filed Apr. 1, 2005. Priority of the respective filing dates is hereby claimed, and the disclosures of these Provisional Patent Applications are hereby incorporated by reference.

COPYRIGHT NOTICE

A portion of the disclosure of this patent document contains material which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

1. Field of the Invention

The present invention relates generally to mobile computing systems and, more particularly, to data management and data deployment in mobile computing systems.

2. Description of the Related Art

Sophisticated customer relationship management (CRM) and enterprise resource planning (ERP) systems are available to improve the automation of back office and front office processes. Although many companies have realized significant savings and efficiencies from deploying such systems, it is also true that many organizations find the systems burdensome to implement and difficult to integrate with existing legacy data systems.

More recently, business organizations and enterprises are deploying CRM and ERP systems to assist mobile employees, primarily to utilize mobile computing devices such as pagers and cell phones and also personal digital assistants (PDAs). One important impediment to greater adoption of CRM and ERP systems that employ such mobile devices involve integration with other data in the enterprise.

Enterprise data integration issues can arise because mobile applications often come in proprietary, closed architectures that impede integration with other data systems of the enterprise. For example, data in the enterprise might be maintained in four or five different sources. Some of the data sources include CRM systems, dispatch systems, ERP systems, and financial records systems. Each of these data sources can utilize a different data architecture, format, and protocol. The data being stored and the configuration of the data and access mechanisms are constantly changing. Many mobile computing systems create an interim datastore in which data from the various sources in the enterprise is collected. In this way, data from the different enterprise data sources, each with a different data architecture and format, can be collected in a single common database. The mobile users can access the enterprise data by accessing the interim datastore, rather than the actual enterprise data sources. The interim store, however, creates data update and conflict issues of its own. Synchronization operations and other safeguards must be performed frequently, to ensure that the data in the interim datastore is a faithful copy of the data in the enterprise data sources.

It is known to provide a data integration solution that can utilize mobile computing devices that interface to enterprise data sources through a network server. Such a system is described in U.S. patent application Ser. No. 10/746,229 abandoned filed Dec. 23, 2003 assigned to Dexterra, Inc. of Bothell, Wash., USA. The contents of this application are incorporated herein by reference.

The Dexterra, Inc. patent application describes a system in which data is utilized between multiple enterprise data sources to mobile clients in a distributed fashion such that requests from a mobile client for enterprise data are received, the appropriate enterprise data sources that contain the requested data are determined, and the enterprise data is retrieved from the determined enterprise data sources. When the enterprise data is retrieved, it is converted into a relational format, even if the data comes from multiple enterprise data sources of different non-relational types (e.g. File System, email, etc). The converted enterprise data is stored in a relational datastore in the mobile client. In this way, mobile applications can be fully integrated with data from multiple enterprise data sources and data updates and configuration changes can be distributed to and from the mobile clients in real time, without using interim data storage, and thereby avoiding complicated synchronization and asynchronous data issues between the enterprise data sources and the mobile clients. The real time data changes can include deployment of changes to the mobile application itself, as well as data updates. The real time changes are further accommodated with data conflict detection and resolution.

The Dexterra, Inc. system referenced above is based on a system architecture in which target enterprise data sources contain objects or data tables, and each target data table is mapped to a data object called a View. That is, a View is defined that corresponds to each data table in the enterprise data sources from which the application will obtain data. The Views can be defined by the application developer, or from another vendor. The data in the Views are shared among one or more data entities referred to as Business Objects. A single Business Object can utilize data from multiple Views, and therefore can utilize data from multiple enterprise data sources, even from data sources that have incompatible data formats.

Once a set of Business Objects is defined, application developers can design applications while dealing with data through their interface to the Business Objects, rather than get involved in describing and defining the Views and Connectors. Thus, developers are presented with a format-free data interface, so that differences in targets are abstracted out from the developer.

The system described in the Dexterra, Inc. patent application referenced above provides a powerful development tool for the mobile computing platform that permits access to a variety of enterprise data sources. Even greater flexibility in the data interface, however, could extend the capabilities of the system and make application development even easier. The present invention provides such greater flexibility.

SUMMARY

In accordance with the invention, a data architecture is provided in which Views define the enterprise data source interface to an application through connectors, but also by Data Objects defined by Commands. Thus, a Data Object comprises a configurable request for data that is issued through Commands to the Adapters of the enterprise data sources. This architecture provides a developer with the ability to create custom enterprise connectivity to disparate backend enterprise data sources. The developer can also separate the connectivity to any backend enterprise system with a configuration and adaptation to the specific instance of an implementation. This allows the technology (connection) between a ".NET" system and a backend system to be developed separately from the configuration of the information required from the backend system, thus creating an abstraction layer and allowing for a configuration tool to manage the adaptation. A development tool kit environment can be provided that permits a user to connect and construct data components to any supported adapter utilizing a "Dexterra Studio" VS.NET plug-in. Components for the tool kit environment include a Connection Object, Command Object, Data Object, and View.

Other features and advantages of the present invention should be apparent from the following description of the preferred embodiment, which illustrates, by way of example, the principles of the invention.

BRIEF DESCRIPTION OF THE DRAWINGS

FIG. 16 shows the Parameters tab of the Add Command dialog.

DETAILED DESCRIPTION

In a mobile data integration system constructed in accordance with the invention, View objects define the enterprise data source interface to an application through connectors, and also by Data Objects defined by Commands. That is, a Data Object comprises a configurable request for data that is issued through Commands to the Adapters of the enterprise data sources. This architecture provides a developer with the ability to create custom enterprise connectivity to disparate backend enterprise data sources. The first description below is of the system described in the Dexterra, Inc. patent application referenced above. Details of the architectural changes of the present invention from that prior system are then described, at "V. Adapter Architecture" and following sections.

I. System Overview

The present invention provides a system in which data is utilized from multiple enterprise data sources to mobile clients executing mobile applications such that the mobile applications are integrated with the multiple enterprise data sources, and data updates and configuration changes can be distributed to and received from the mobile clients in real time, without using interim data storage. The elimination of an interim data storage facility avoids complicated synchronization and asynchronous data issues between the enterprise data sources and the mobile clients. Thus, data updates and system configuration updates for the mobile application can be communicated from the enterprise to the mobile clients, and from the mobile clients to the enterprise, in real time. No special synchronization operation is needed, as changes can be propagated through the system in real time.

II. System Platform

Figure 1:
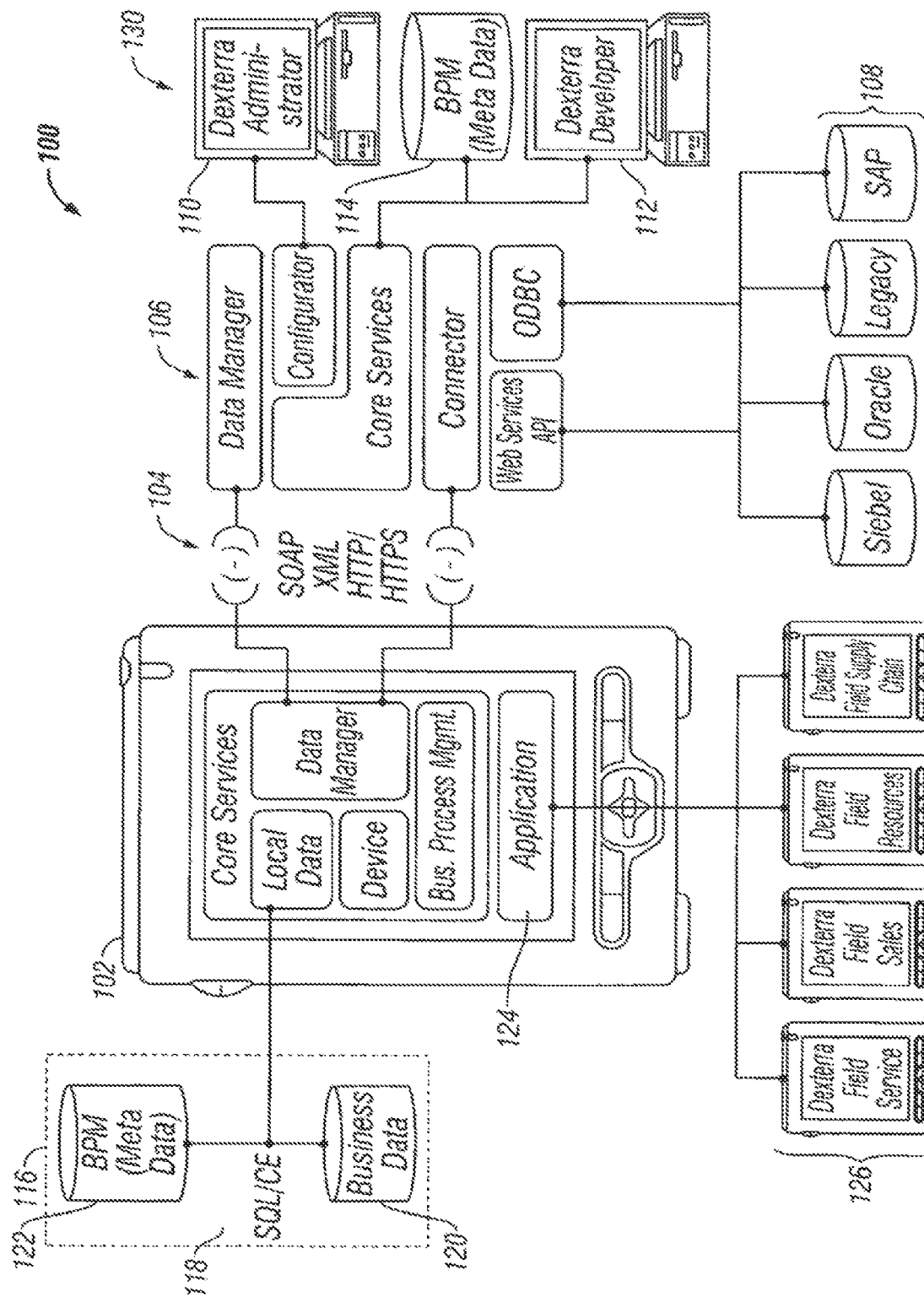
FIG. 1 is a block diagram of a suitable computer system environment for a mobile enterprise platform constructed in accordance with the present invention.

FIG. 1 is a block diagram of a suitable computer system environment 100 constructed as described in the above-referenced Dexterra, Inc. patent application. in accordance with the present invention. FIG. 1 shows a mobile client device 102, such as a Personal Digital Assistant (PDA) device that operates in conjunction with the Microsoft PocketPC or Palm PDA operating systems. The mobile client device communicates over a network connection 104 with an application server 106 to request data from the server and receive data updates, provide new data, and receive configuration changes. It should be understood that multiple mobile clients 102 can communicate with the server 106. Only a single client device 102 is shown in FIG. 1 for the sake of drawing simplicity.

The mobile clients 102 consume the server-side connector web services for real time data retrieval from multiple enterprise data stores. Additionally, the mobile clients consume the server-side data manager web services for the management of real-time client-side data updates, server side data updates and system configuration updates.

The application server 106 communicates with enterprise data sources 108, such as CRM data sources, ERP sources, financial system resources, legacy data stores, and the like. The exemplary enterprise data sources illustrated in FIG. 1 include data including "Siebel" software from Siebel Systems, Inc. of San Mateo, Calif., USA; "Oracle" software from Oracle Corporation of Redwood Shores, Calif., USA; "SAP" software from SAP AG of Walldorf, Germany; and legacy software. The administrator application 110 and a developer application 112 communicate with the application server 106, which also stores metadata 114 for the system, as described further below.

The application server 106 provides data manager, configuration, and data connector web services for data interchange and updating, user authentication, security, and logging services. The application server also handles business process management in the form of business information and rules.

The mobile client 102 also includes a datastore 116 that includes a relational data base 118 that stores business data 120 and also a relational database that stores metadata 122 for application execution on the mobile client. An application 124 that is installed at the mobile client 102 includes various software components that perform suitable functions. For example, the application might comprise a field service application that informs field service personnel as to a location at which service has been requested, explains the nature of the service request, and provides for logging the service visit and settling the account. The application 124 may include multiple applications that process the data requested by the mobile client 102.

The administrator application 110 and developer application 112 together comprise a "Studio" component 130. In the illustrated embodiment, the administrator and developer are provided as two separate applications, and provide a means to configure the system, including the metadata data and application interfaces.

The system 100 comprises a mobile enterprise platform that supports the service application 124. The system provides a set of Web services that effectively deploy and manage mobilized software solutions to enhance mobile business processes. Common examples include integrating to CRM or ERP, sales force automation (SFA), and customer support and help desk functions for an enterprise. Such enterprise applications depend on cross-application interaction, in that data from one function or system is often used by a different function or system. When executed on the mobile client, the existing application functionality and enterprise information is utilized among multiple enterprise software applications, legacy data systems, and mobile workers. In this way, a significant return on investment can be achieved for these applications and for the mobile enterprise platform.

The mobile enterprise platform 100 provides Web services that simplify the use of mobile clients and associated portable devices in the field. These Web services include a data manager function, a configuration function, and a connector function. These will be described in greater detail below. The applications 124 that are installed on the mobile clients 102 can be fully functional in any connected or disconnected state, after they have been properly initiated by the application server 106.

III. Logical Architecture

Figure 2:
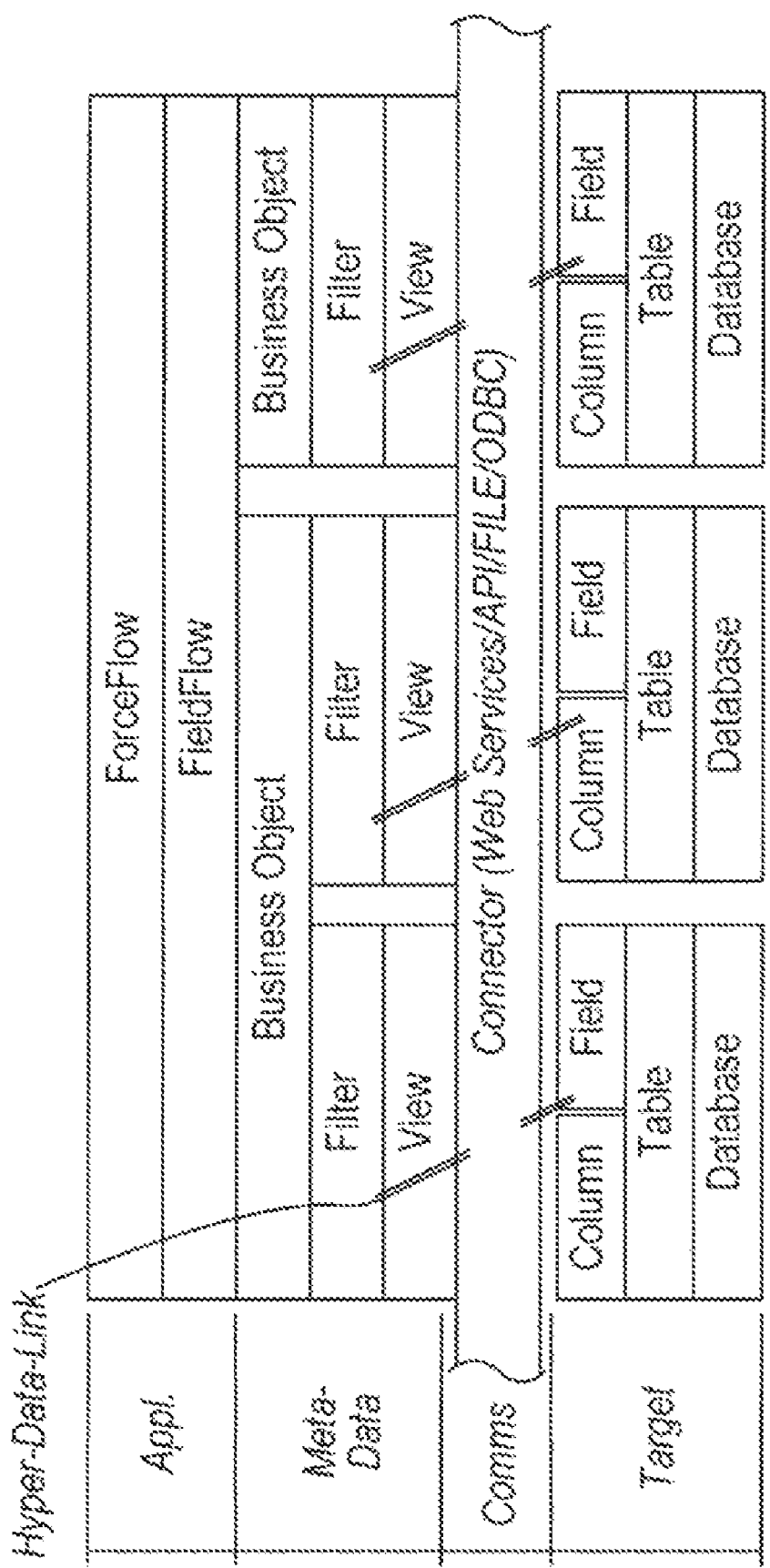
FIG. 2 is a block diagram of the logical architecture of data in the mobile enterprise platform illustrated in FIG. 1.

Any client application that makes use of the Mobile Enterprise Platform illustrated in FIG. 1 will utilize the system components illustrated in the block diagram of FIG. 2. These components include:

Business Objects—programmable objects based on business concepts, combining fields and relating information from different enterprise data sources. (e.g. data sources such as Customer, Contacts, Assets, Tasks, etc.).

Business Rules—custom logic to enforce business processes utilizing business constants with checks applied against business data from the enterprise data sources.

Business Constants—A user-configurable variable for use throughout the client applications, and client and server-side business rules (e.g. Business Rules, Warning Messages, and the like).

Datasource Connectors—data source connectors designed to seamlessly provide access to a wide variety of enterprise data sources (e.g. databases such as those formatted according to Oracle and SQL Server, messaging systems such as MQ Series or MSMQ, CRM applications such as Siebel or Peoplesoft, generic web services, and so forth).

Business Process—metaphors, such as a "Force Flow" process of Dexterra, Inc. of Bothell, Wash., U.S.A., that defines a form-to-form navigation paradigm for modeling business processes.

Forms—a combination of standard visual display screens (e.g., View, Edit, Find, and the like) with event driven logic that are designed to show information, gather information, and direct the user through a given business process, referred to herein as either a "ForceFlow" or a "FieldFlow".

Views—A modifiable representation of the data identified from an enterprise datasource or application that is utilized by one or more Business Objects.

Filters—A Filter that can be applied to a View to modify the data available to a Business Object.

These components can be used to specify the configuration (logical architecture) of any client application that is constructed utilizing a technology framework such as the Microsoft Corporation ".NET" and tools such as Microsoft Corporation's "Visual Studio .NET". Those skilled in the art will be familiar with such programming tools to specify an application and its associated data objects.

The Mobile Enterprise Platform illustrated in FIG. 1 is implemented as a metadata driven framework. The framework provides integrated client and server web services, enabling the connection, configuration, and data management services necessary to deploy fail-safe, mission-critical mobile enterprise solutions.

FIG. 2 illustrates that, in the mobile enterprise platform of FIG. 1, the structure of relational database tables and external application business objects are mapped to views as metadata. One or more views are consumed by Business Objects, also defined in metadata, which are in turn utilized by the mobile application. The mobile application utilizes a client framework, referred to as the "Dexterra Smartclient", which manages the instantiation of the Business Objects, Local Data Access to the underlying physical database that resides on the mobile client device, Device integration, as well as the client-server data communication via the data manager and/or connector web services. Within the platform, specifications for all logical layers (e.g., Business Objects, Views, Filters, and Connectors) are defined and maintained within the metadata.

The mobile enterprise platform is architected as a logical stack, designed to insulate layers in the logical architecture from all but non-adjacent members. At the bottom of the logical stack, the Target layer, is data that resides in back-end, enterprise data sources. The platform works with the source data in place, and does not require information within the back-end system of record to be replicated to a middle-tier replication database. That is, no interim datastore is needed. This provides flexibility in design, as well as real time data access and can help reduce total cost of ownership of the platform and applications, and assists simplification of data management processes.

The next layer up in the logical stack is the Connector layer. The Connector layer provides a programmatic construct that describes the back-end datastore to the application server in a relational format. The information regarding how to connect to an enterprise data source, as well as the security settings (such as authentication methods and user and group definitions) are stored within metadata, and are maintained using the Administrator component.

The next layer in the stack is the View layer, which comprises objects that provide a one-to-one mapping to an object or table in a back-end, enterprise data source. For example, if a back-end system has a table called CUST_ADDR (customer address), and data from that table is required for use in an application, then a View will be created in the Administrator component. The Administrator View might be called, for example, CUSTOMER_ADDRESS, to represent that data in the environment of the mobile enterprise platform, outside of the enterprise data sources. It should be understood that a View has properties that correspond to the properties or columns of the data object in the back-end system. However, it is not required that all properties in the back end data source are required as properties in the View. Indeed, the properties required are defined in the administrative component and stored as metadata In the example just provided, the properties might include fields such as ID, STREET_ADDR, CITY, STATE, and ZIP_CODE.

Additionally, the user can define the data types of the properties within the View, and these data types can be independent of the data types of the corresponding properties in the enterprise data source. Other options of the view properties that can be identified are unique identifier, read only, indexing, required property and length. All the above information is stored as metadata.

The View layer also provides an indication of data conflicts, and provides a means for resolving such conflicts. Data conflicts can occur, for example, whenever there are data changes between what is being uploaded from the mobile client and what exists at the server. Resolution of such conflicts can be performed at the View layer, enforcing business rules such as permitting the most recent data change to always take precedence, or permitting data changes from a particular source (e.g., either the mobile client or an enterprise data source) to take precedence depending on the data type (e.g. field data or customer account data). This is described further below, in conjunction with the Data Manager Web Service.

As illustrated in FIG. 2, the Views can be defined against multiple objects in multiple datastores, thus providing flexibility in application deployment and in the use of in-place systems, without the burden of data replication. As with the Connectors, the definitions of Views are stored in metadata, and are managed with the Administrator. Those skilled in the art will understand details of data definitions in metadata, without further explanation. As noted above, Filters can be applied to the Views, to modify the data that is passed to the next layer. The Administrator provides View management features, including a Views Wizard that automatically creates Views based upon the object interface or table definition of the back-end datastore objects (from the enterprise data sources).

The next layer up in the FIG. 2 diagram includes the Business Objects, which are mapped, or associated with, one or more Views. A Business Object of the platform is the programmatic entity with which a developer will interface with when building customizing mobile applications. The Business Objects include multiple properties, each of which can be of a simple data type, or can be another Business Object. Because the Business Objects of the platform can be mapped to multiple Views, developers can work with a single entity that represents data sourced from multiple, heterogeneous data sources. Thus, a single Business Object defined in accordance with the mobile enterprise platform of the invention can include data from multiple, potentially incompatible enterprise data sources, such as from different proprietary formats.

In creating or modifying applications for the mobile applications and mobile client devices, developers can interact solely with the Business Object layer. This insulates the developers from any requirement to understand or interact directly with the back-end systems (enterprise data sources) for the source data. In this way, the Business Object layer provides an object-based interface for application developers, abstracting the details of persistence and retrieval of data. There is no need for the developer to directly interact with the local datastore on the mobile device. In addition, due to the nature of disconnected data, the mobile client, through the Business Object interface, automatically manages the processing of data changes, by storing data changes locally in the client that will be passed to the application server during an Update process. This further insulates developers from this rote programming task.

The Business Objects exist on the mobile client device as metadata, and are also managed using the Administrator (FIG. 1). The use of metadata throughout the mobile enterprise platform provides an environment in which the attributes and behavior of most data entities can be configured through a graphical user interface rather than coded.

The metadata-driven nature of the mobile enterprise platform enables performing business processes on the mobile client through a stateless server architecture. Through the metadata, the mobile application can be configured and customized. The metadata defines the structure of the business objects referencing the business enterprise data to the mobile device and defines the events that trigger business rules that govern the business processes.

The metadata database contains the reference of the cross-functional, cross-application back-end business information that is exposed through the Connectors to configure a business object. This process is accomplished through the Studio component (FIG. 1) to configure and reference the connecting enterprise data source business information with the Business Objects. This provides the path to the specific data for the mobile applications, ensuring that no business data from an enterprise data source is stored in its native data format on the application server or on any other interim datastore of the system for data updates. This non-invasive and real time synchronous approach using the metadata permits the mobile enterprise platform to effectively connect to back-end systems with a minimum amount of disruption while maximizing cross-functional data access, data consistency, and data integrity.

IV. Mobile Enterprise Platform Components

A. Mobile Applications

As noted above, the mobile client 102 (FIG. 1) can include installed applications 124 that implement business processes of the enterprise. The application can leverage the mobile enterprise platform described above, and demonstrates how the application instantiates the business objects which drive the business process configured in metadata.

For example, Task or Work Order information would be provided to the mobile application through views and would be accessed via a business object. In retrieval of the business data via the view definition, using the data manager web service, the business object can deliver the business data to the mobile application to describe the tasks. This data is stored on a local relational database on the mobile device. When an update to the task data is committed to the task business object in a request from the application, the Smartclient application will persist the changes to the view defined datastore on the mobile client, then the Smartclient manages the data updates back to the original data source via the data manager web service, ensuring data integrity and consistency.

By utilizing the depth, breadth, and power of web services (e.g., connection, configuration, and data manager services) that are available in the mobile enterprise platform described herein, a large suite of mobile applications can easily be constructed, including applications such as sales force productivity, customer service, and support solutions. Such applications can be integrated with a broad set of vertical applications including oil/gas, healthcare/medical and financial service industry solutions.

B. Server Components

The application server is a type of metadata-driven platform application and provides information, applications, and business processes to the mobile client, and ensures managed data integrity between the mobile enterprise platform and a host of back-end enterprise data sources. The application server is a process-based, high performance solution built on the ".NET" technology from Microsoft Corporation of Redmond, Wash., U.S.A. Using the ".NET" technology, the mobile enterprise solution is a framework that is Web Services native through the use of XML and SOAP for data exchange and transport. The application server provides three core Web Services, as shown in the functional architecture diagram of FIG. 1.

Connector Web Service

The Connector Web Service delivers non-invasive integration of the existing enterprise applications infrastructure while maintaining control of the Data-Integrity Conditions between the mobile clients and the discrete enterprise data sources.

Configuration Web Service

The Configuration Web Service manages the metadata defining the business data, business objects, business rules, business constants, and system configuration such as authentication, logging, security, and roles that encompass the mobile applications that are passed to the mobile client—the component application that is resident on the mobile device.

Data Manager Web Service

The Data Manager Web Service orchestrates the update interactions between the mobile client application, the application server, and the third-party enterprise data sources. Additionally the Data Manager Web Service provides the ability to directly communicate with the connector layer for real-time queries. The Data Manager Web Service delivers flexibility in the manner that manages the various conditions concerning multiple updates by multiple users to the multiple enterprise data sources to enforce the integrity of the data. The Data Manager Web Service can do this via the application server or direct to any API and/or third-party published Web Service.

In this way, the Data Manager Web Service can manage deployment of application updates and data changes throughout the mobile clients of the system.

Each of these components will next be described in greater detail.

1. Connector Web Service

The Connector Web Service is designed to support communication with any ODBC-compliant data source or Web Service API. The Connector Web Service allows a customer to define and build views based on data stored in one or more third-party systems. The Connector Web Service has a published interface that allows for standard bulk updates as well as real-time data access from a mobile client.

The Connector Web Service provides the physical layer connection between the application server meta-application and the specific interface of the enterprise data sources. The connectors support database dispute management and notification services, transaction management, and error handling. In a default customer configuration, the mobile enterprise platform system is deployed to customers with an ODBC or Web Service connector. Those skilled in the art will be able to produce connectors to the most common enterprise systems, such as Siebel, SAP, PeopleSoft, Oracle, SQL Server, and the like.

For example, an "Oracle" applications connector allows a customer to make calls to Oracle support services, either through the closest data constructs the customer has to APIs (such as PL/SQL procedures) or directly to the enterprise database itself via ODBC. As with all of the ODBC connectors the dynamically interrogation of the RDBMS schema is automatically executed, exposing the specific physical design of the database. This gives the customer a hierarchical view of the actual interfaces into that system.

Figure 3:
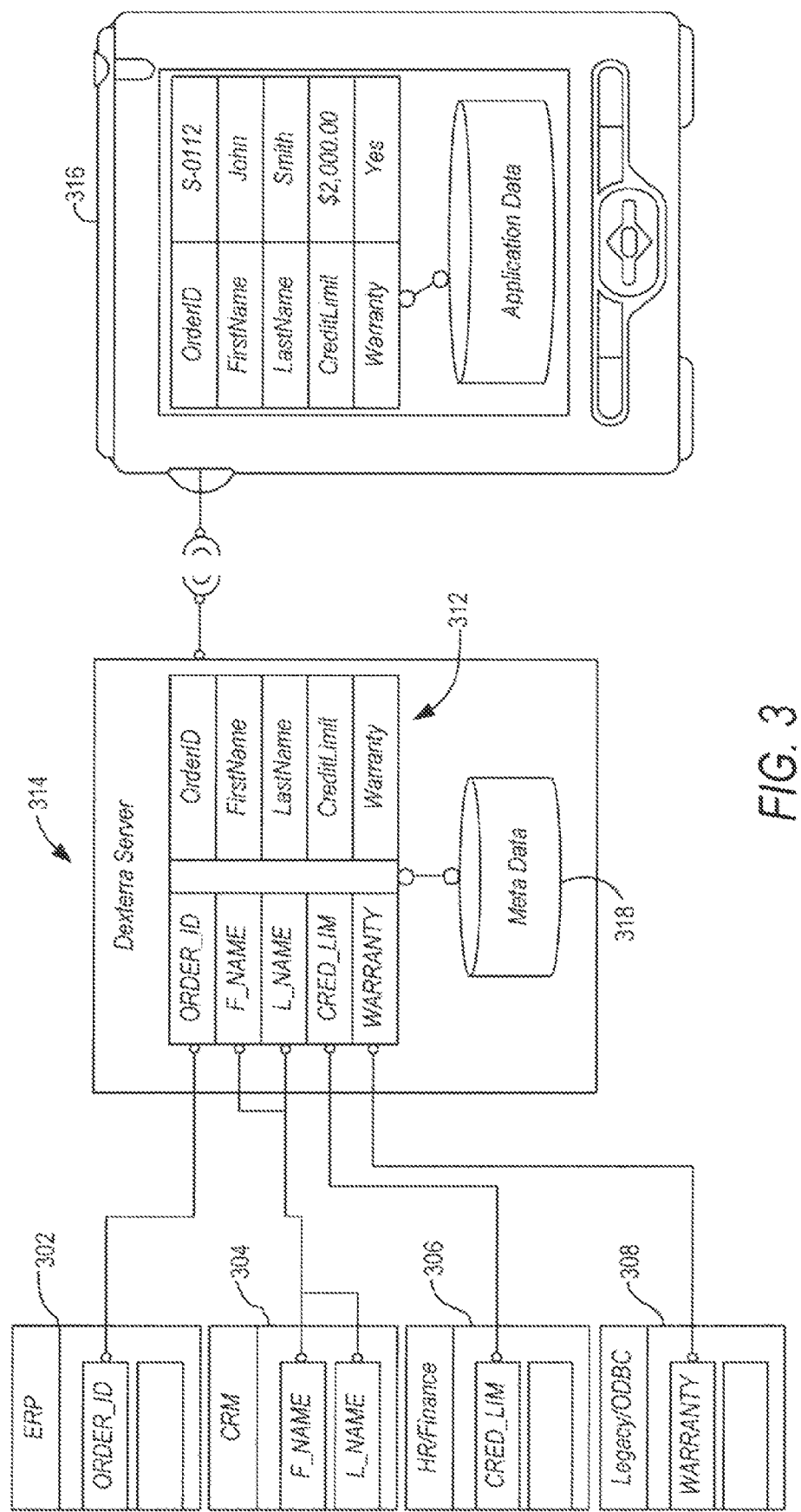
FIG. 3 is a block diagram that illustrates the Connector interface between the enterprise data sources and the mobile client of FIG. 1.

FIG. 3 shows an example of how the Connectors interface the enterprise data sources to the mobile enterprise platform. On the left side of FIG. 3 are representations of multiple enterprise data sources, including an ERP data source 302, a CRM data source 304, an HR/Finance data source 306, a Legacy/ODBC data source 308, and can include other Web Services or other sources (not shown). In the middle portion of FIG. 3 is a representation of the metadata 312 that specifies to the application server 314 how data from the different enterprise data sources will be stored and related in the mobile client 316, which is represented at the right side of FIG. 3.

Thus, in this example, data identified as ORDER_ID exists in the ERP data source. Data identified as F_NAME and L_NAME exists in the CRM data source. Data identified as CRED_LIM exists on the HR/Finance data source, and data identified as WARRANTY is stored in the Legacy/ODBC data source. All of these identified data are stored in enterprise data sources, such as at back-end office systems.

In the metadata 312, the data definition from the enterprise data sources is mapped to views that are used to create the data store on the client and store the relevant business data on the mobile client from the enterprise data sources in a relational database. Access to this business data is performed via a the business object layer defined and stored in metadata on the mobile client. As shown in FIG. 3, the ORDER_ID from the ERP data source is mapped to a business object property called OrderID, whose relational definition is stored in metadata 318 on the mobile client 316 and utilized by one or more the mobile applications also defined in metadata. The F_NAME data from the CRM enterprise data source is mapped to (stored into) the FirstName business object property definition stored in the mobile client database, and the L_NAME data is mapped to the LastName business object property. Similarly, the CRED_LIM data from the HR/Finance data source is mapped to the CreditLimit business object property, and the WARRANTY data from the Legacy/ODBC data source is mapped to the Warranty business object property. Thus, data from the potentially dissimilar and incompatible disparate enterprise data sources 302, 304, 306, 308, 310 are delivered to the mobile client through the Data Manager Web Services to the local data store (represented by the lines from the enterprise data sources to the application server 314) in the proper format for access using one of the business objects on the mobile client (indicated in the mobile client 316 with actual values).

Connector Types

The connectors that are supported by the Connector Web Service include the following three connector types:

1. The Web Services connector is used when the mobile platform is connecting to a third-party system (a) that is either non ODBC-compliant, or (b) does not allow ODBC/RDBMS connectivity, or (c) whose interface is defined by a standard API and can be wrapped and defined by Web Service Descriptor Language (WSDL).
2. The ODBC/RDBMS connector is used when connecting the mobile platform to a third-party system (a) that is ODBC compliant and (b) allows for direct ODBC/RDBMS access and (c) whose data is located physically within the same LAN environment or accessible via a communication protocol supportive of the transport (such as RPC, TCP, etc.).
3. The API connector is similar to the Web Services Connector but (a) requires the API to be accessible via non internet protocols such as RPC and (b) is used if the Web Services Interface is not available.

Reading schema, via the ODBC/RDBMS connector, information is accomplished through the use of the Studio portion 130 (FIG. 1) of the mobile enterprise platform, using the Administrator application. The Studio portion is used to configure the View definition mapping to the backend data source and map the definition of one or more Views to one or more Business Objects. When defining the View definition or mapping the Views to Business Objects, using the administrator, the information is stored as metadata. During an update process with the application server and enterprise data source, the metadata is read to determine how to read, persist and remove the data (select/insert/update/delete functions) while managing and enforcing the data integrity using such functions as conflict detection/resolution, transactions both inherent and compensating where appropriate.

Using the ODBC/RDBMS connector, data is read, persisted and/or removed via ANSI SQL statements and/or stored procedures in the case of Microsoft Corporations SQL Server or Oracle's RDBMS (8i, 9i, etc.). Using the Web Services/API connector, data is read, persisted and/or removed by calling the appropriate API function or method for the transaction.

2. Configuration Web Service

The Configuration Web Service consumed by the Dexterra Studio provides an easy interoperable way for administrators, business analysts and developers to implement, configure, and administer the Dexterra Mobile Enterprise solution. The Configuration Web Service allows for easy manipulation of the metadata used to configure and customize the data and process definitions of Mobile applications. This service will be better understood with reference to the features of the Administrator component, which is described in greater detail below.

3. Data Manager Web Service

Update Process Model

An update process model is utilized in the system, in which mobile applications update their locally held data (either the application or its business objects) with the backend enterprise database using a set of core Net components that are exposed as Web Services for easy interoperability.

The Data Manager Web Service updates the mobile application and all its associated business objects defined data. The Update process model enables two-way data transfer between the enterprise datasources via the Dexterra application server and the mobile client, allowing updates to be made while the mobile client is connected to the network, merging the updates between clients when they are connected. When in the disconnected state, updates are managed in the client environment, until a time at which a connected state is attained and the update request can be initiated.

The update process model takes the "all or nothing" approach. If a failure occurs before the entire stream is downloaded from the application server onto the mobile client (or before the entire stream is uploaded from the client to the server), then the Data Manager Web Service on the application server does not receive a confirmation on the download transaction (or upload). As a result, the server carries the intelligence to manage the client state as to whether it requires a roll back of data or simply a retry. When the mobile client performs an update process operation the second time, the application server takes into account the original information state and may either deliver the results if the application server has processed or process again in the event all the required information was never received by the application server thus enforcing the reliable deliver of information once and only once between the mobile client and application server. This, in event, enforces the integrity of the data as it moves from mobile client to one or more back end data sources.

Update Process Breakdown

Two types of update processing are supported:

1: Get Latest: In this update type, the mobile client makes a request to get the latest information from the enterprise data sources via the Dexterra application server. The Dexterra application server process the request and retrieves the business information from the multiple data sources using the Dexterra Connector Web Service and delivers the business information to the mobile client.
2: Update (2-way update): In this update type, records on both the client and server end are interchanged enforcing the integrity of the data on both the mobile client and the back end enterprise data sources using Dexterra Conflict Resolution configured parameters.

Conflict Detection/Resolution

Conflict resolution describes the rules used to arbitrate on data conflicts caused by changes made between a mobile client and one or more back end enterprise data sources. This is performed first by identifying the conflict (Detecting) and then resolving (Resolution) the conflict in one or more various ways.

The Dexterra application server can detect conflicts in one of three ways: Revision, Date/Time Stamp or Manual as well as identify a conflict situation by row or column level.

Revision is a setting where a specific field or property is identified in a single record source as revisioned and the Dexterra application Server will use this to determine whether data has been changed on either the back end data source or the mobile client.

Date/Time Stamp

Date/Time Stamp is a setting where a specific field or property is identified in a single record source as date/time stamp and updated upon any insert/update or delete and the Dexterra application Server will use this to determine whether data has been changed on either the back end data source or the mobile client.

Manual is a setting where there is no specific field or property to identify a conflict situation in a single record source therefore the Dexterra application Server compares all the field or property data to define uniqueness and detect whether data has been changed on either the back end data source or the mobile client.

Depending on configuration of the Dexterra application Server, Conflicts are resolved in one of four ways: First Update Wins, Last Update Wins, Admin Resolution or Server-side Rule First Update Wins Under the First Update model the application server will only accept changes of any record that is the first one to make an update. If a record is first updated by the back end data source and a conflict is detected by the Update Web Service, instead of returning an error, the Data Manager Web Service will drop the version provided by the client and return a copy of the latest version of the record from the back end enterprise data source to the mobile client.

Last Update Wins

Under the Last Update Wins model, the server need not detect conflicts. Instead, it simply persists the changes from the mobile client to the back end enterprise data source overwriting the current record in the back end enterprise data source.

Admin (or Manual) Resolution

When configured for Admin/Manual resolution, the server will treat all conflicts as requiring manual intervention to resolve and will return a copy of the current record from the back end enterprise data source and optionally notify via any notification service (SMS, Emai, etc.) that a conflict situation has arisen and allow for resolution via the Dexterra Administrator. Doing so allows for column level conflict resolution since the Administrator determines the values to reapply back to the back end enterprise data source selectively.

Server Side Rules

Customizable Server Side Rules can be created to determine more programmatically and specifically how certain conflict situations should be resolved. For example, a conflict may be resolved based on the values of data in a record. This flexibility allows for complete control over the specific actions surrounding a conflict resolution scenario.

Client Deployment from the Server

The application server contains the definition of one or more mobile field applications that are to be downloaded to the mobile client, including the Forms/screens represented as tasks (referred to as "FormFlows"), data-interactions (referred to as a "FieldFlow"), and groups of FormFlows and FieldFlows constructed into a Business Process/Workflow (called a "ForceFlow"). The FormFlows, FieldFlows, and ForceFlows are described further below. The application definition also includes the configured metadata associated to an application such as View, Business Object, Business Constants definition. Also included in the deployment is the specific business data from one or more back end enterprise data sources required to run the mobile client in an "occasionally" connected state.

The application server provides the foundation on which to deliver and manage applications and to connect to existing enterprise data sources and systems. The mobile enterprise platform applications are distributed and managed to the mobile devices, such as Pocket PC and Tablet PC devices, by the application server, providing a highly manageable administration of all user interfaces in the field.

C. Administrator Component

As noted above, the Administrator component (FIG. 1) allows system administrators to perform changes that are relatively regular or frequent. The Administrator component provides access to decision variables, drop-down list content, and other information in a format appropriate for business analysts or administrators to manage. This approach to administration allows system administrators to extend many functions down to the Administrator level without compromising system integrity.

For example, data comprising business information that is used to define the business processes of the enterprise can be received through a Business Objects definition form. The Configuration Web Service provides access to this aspect of the Administrator component.

D. Client Component

As noted above, the client 102 (FIG. 1) in the enterprise platform architecture provides a framework in which the mobile application allows the use of role-based business processes using techniques referred to as "ForceFlow", "FieldFlow", and "FormFlow", and using Web Services, thus enabling communications between the mobile client and the Dexterra application Server and the enterprise data sources over a LAN/WAN network, such as the Internet, via wired and wireless connections. The mobile application running on the client devices functions in a manner that is optimized for small form-factor devices providing an exception, easy to learn user experience.

In the illustrated system, the client is an object framework that is built utilizing the ".NET Compact Framework" of Microsoft Corporation that is metadata aware. The client component enables delivery of enterprise-class application functionality on the mobile devices, which preferably operate according to the "PocketPC" operating system or Microsoft Tablet PC operation system from Microsoft Corporation. The client component also integrates with existing "PocketPC" functionality to provide seamless integration with Calendar, Task, and Today screen functionality of the PocketPC interface. It thereby provides a stable, effective environment in which to work.

FormFlows, FieldFlows, ForceFlows

Any business process tasks or steps or operations in the form of display screens are called "FormFlows". The FormFlows are used to initiate process interactions called "FieldFlows" that allow the initiation of business processes, which are referred to as "ForceFlows". The FieldFlows allow launching of "out of band" ForceFlows to bring real-world elasticity to the business processes.

The FormFlows are broken into three categories: (1) Information; (2) Activity; and (3) Update. An Information FormFlow is a screen that shows information needed by a mobile user to fulfill the next logical task in the business process. An Activity FormFlow is a screen that shows something the user may need to do or perform. An Update FormFlow is a screen that is displayed when a mobile user is prompted to enter data that will be returned to the host applications (the enterprise data sources).

A FieldFlow may be required, for example, when a part might have failed and a search of inventory databases might need to be performed to see if any matching parts or similar problems with solutions exist and are available, called a lookup, or a FieldFlow may be required when a part might need to be ordered or assigned or scheduled for delivery to the client, a FieldFlow called an update.

A ForceFlow is a business process, and therefore is a collection of

FormFlows and FieldFlows. An example of a ForceFlow would be time, travel, and expense recording that is associated with a job or dispatch event.

Referring back to FIG. 2, this block diagram shows how the relationships between columns and fields in the target application are related to information In the "FormFlows" (steps in the business process represented as "Forms" in the application) and are then associated into the ForceFlow (the business process). There can be many Business Objects in one Form-Flow and potentially more than one FormFlow in any business process.

Filters allow characteristics and conditions to be placed onto the data when referenced in the mobile application. For example, data type (e.g., Date), valid types (e.g., only Monday through Friday), and any conflict conditions may be detected. Other filter characteristics and conditions can be configured.

Views define the data and storage location for use in one or more Business Objects, and the Business Object can be based on one or more Views. This allows additional characteristics to be associated. For example, a Business Object may be referred to as "Customer", which may Include standard customer details; location, contacts, inventory, and also SLA and other attributes that the application would like to classify as Customer but not held in the same Target table or even Target application.

V. Adapter Architecture

Figure 4:
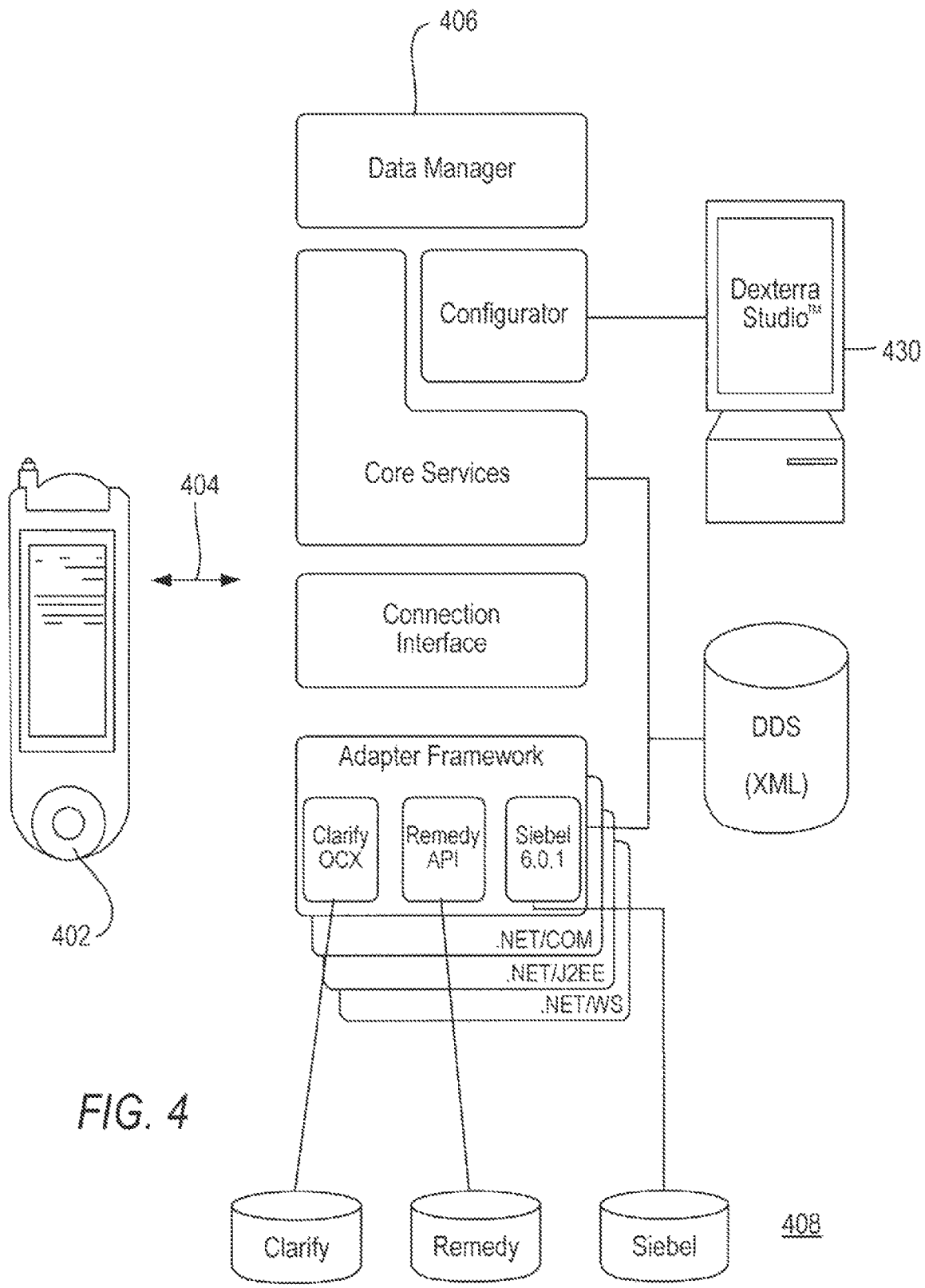
FIG. 4 is a block diagram of a suitable computer system environment 400 constructed in accordance with the present invention.

The adapter architecture in accordance with the present invention is illustrated in FIG. 4. Some of the components illustrated in FIG. 4 are analogous to components illustrated in FIG. 1. Components in FIG. 4 that perform functions for which a corresponding component is provided in the FIG. 1 system will be identified in FIG. 4 with the same reference numeral, except for beginning with "4" rather than "1".

FIG. 4 is a block diagram of a suitable computer system environment 400 constructed in accordance with the present invention. FIG. 4 shows a mobile client device 402, such as a Personal Digital Assistant (PDA) device that operates in conjunction with the Microsoft PocketPC or Palm PDA operating systems. The client device 402 includes the same components as described in connection with the client device 102 of FIG. 1, but are not illustrated in FIG. 4 for simplicity of illustration. The mobile client device 402 communicates over a network connection 404 with an application server 406 to request data from the server and receive data updates, provide new data, and receive configuration changes. It should be understood that multiple mobile clients 402 can communicate with the server 406. Only a single client device 402 is shown in FIG. 4 for the sake of drawing simplicity.

The mobile clients 402 consume the server-side connector web services for real time data retrieval from multiple enterprise data stores. Additionally, the mobile clients consume the server-side data manager web services for the management of real-time client-side data updates, server side data updates and system configuration updates.

The application server 406 communicates with enterprise data sources 408, such as CRM data sources, ERP sources, financial system resources, legacy data stores, and the like.

A "Dexterra Studio" component 430 communicates with the server 406 and includes an administrator application and a developer application (not illustrated in FIG. 4). More particularly, the Studio component interfaces with the Configurator of the server 406, and a data server DDS interfaces with the server and the Adapter Framework of the server 406, which communicates with the enterprise data sources 408.

The Adapter Framework provides an interface that will enforce specific inputs and outputs required in moving data between the server 406 and any other enterprise data source. The Data Manager of the server 406 will request and respond to any properly defined connector component to communicate with the enterprise data sources 408 through the Adapter Framework. Thus, the server 406 uses the definition of the Connection Objects, Command Objects, Data Objects, and Views to determine how and what data to retrieve or persist to a back end enterprise data source.

A design tool kit ("Dexterra Adapter Designer", or DAD) is supplied with the Studio 430 to permit developers to specify the components of the Adapter Framework. That is, the DAD 430 provides a developer with the means to connect and construct Adapter Framework data components to any Dexterra Supported Adapter utilizing the Dexterra Studio VS.NET plug-in. Components include Connection Objects, Command Objects, Data Objects, and Views.

Using the DAD 430, a developer will create a Connection Object to a back end data source using a Dexterra Supported Adapter. This Connection Object will expose (either using Discovery/Intraspection or Description) the data interface object(s) available through the Adapter as either a Table, Stored Procedure, Script or Object (EAI, etc.) Using the Dexterra Adapter Designer, a developer will then create a series of Command Objects that perform specific actions through an Adapter such as Select, Insert, Update and/or Delete. A developer then defines a Data Object in which they will select the appropriate Select Command, Insert Command, Update Command, and/or Delete Command. A View is then bound to the Data Object for its request/respond actions. Using this tool and architecture, a developer can request and persist data from one or more back end enterprise data sources mapped to a single defined data object within the Dexterra Server 406, thus providing a layer of abstraction to the physical data structure and interface capabilities. These actions can be carried out through the user interface of the tool 430, as described further below.

A. Command Objects

The Command Object of the Adapter Framework defines an action to be performed through an Adapter (i.e., Connector) to retrieve or persist data. For example, a "SaveCustomer" command might be defined to save a Customer data object to an enterprise data source through an Adapter. Command types or formats will be determined by the Adapters according to the enterprise data sources with which they interface and therefore must support. For example, potential Command types for a mobile data system might include Table, Procedure, SQL, Script, and Object.

The Command Objects will specify an action that will be performed. In accordance with the invention, the Command action types include five defined actions: (1) READ, (2) ADD, (3) UPDATE, (4) REMOVE, and (5) READ for EDIT. These Command actions are described further below in conjunction with the Data Object discussion. Command Objects can specify filters, which will operate when a Command is executed. Each filter will operate on data in accordance with the data type of its corresponding Command type. A Command will include a Column attribute, which comprises the columns of data that are returned when the Command is executed. Lastly, a Command includes parameters that specify values necessary for proper execution of the Command.

B. Data Objects

The Data Object associates Command Objects to retrieve or persist data, logically grouping them into a single object (e.g. a Customer object). A Data Object is defined by (that is, it is the result of) Commands that are executed on enterprise data sources, through the Adapters. As noted above, Commands include READ, ADD, UPDATE, REMOVE, and READ for EDIT. The READ Command is a Command object that will retrieve data, define which data columns are returned and what their attributes are, and will override Data Types for casting from Adapter to the ".NET" paradigm. The ADD Command is a Command object that will persist new instances of data through an Adapter to insert new data instances back into the corresponding enterprise data source. The UPDATE Command is a Command object that will persist changes to existing data items through an Adapter back to the corresponding enterprise data source. The REMOVE Command is a Command object that will remove data from an enterprise data source through an Adapter. The READ for EDIT Command is a Command object that will retrieve a single record with a RowLock through an Adapter.

The defined Data Objects will map the return elements of the READ Command to the parameters of the ADD, UPDATE, REMOVE, and READ for EDIT Commands. A single defined Data Object can retrieve and persist data through different Commands to potentially different Adapters.

C. Connections

As before, the Connections will interface to the enterprise data sources to provide data access by the mobile client application. In the Adapter Framework 430 described in connection with the present invention, the Connections will not communicate directly with Views, but will instead interface directly with the Command Objects, which will eventually exchange data with the Data Objects and Views.

VI. Configuration and User Interface

In the Adapter Framework in the Server 430 of the FIG. 4 configuration, a View is not bound to a single data table, as would be the case in a system without the present invention (and as indicated in FIG. 2). Rather, a View is bound to a Data Object with defined Commands for READ, ADD, UPDATE, REMOVE, and READ for EDIT. Thus, a much more versatile data interface is provided. The structure of a View is defined by the selected data columns specified in the READ command for the Data Object.

In the system that utilizes the View object configuration of the present invention, filters are created at a Command Object, rather than at a View object. The configuration of the View Objects in the server 430 enables abstraction of View CRUD (Create, Read, Update, Delete) operations to the enterprise data sources, and enables CRUD to be defined instead of hard coded. Other than the changed View configuration and concomitant changes such as for creation of filters, the remaining components illustrated in FIG. 1 can be utilized for a mobile platform system constructed in accordance with the present invention.

Figure 5:
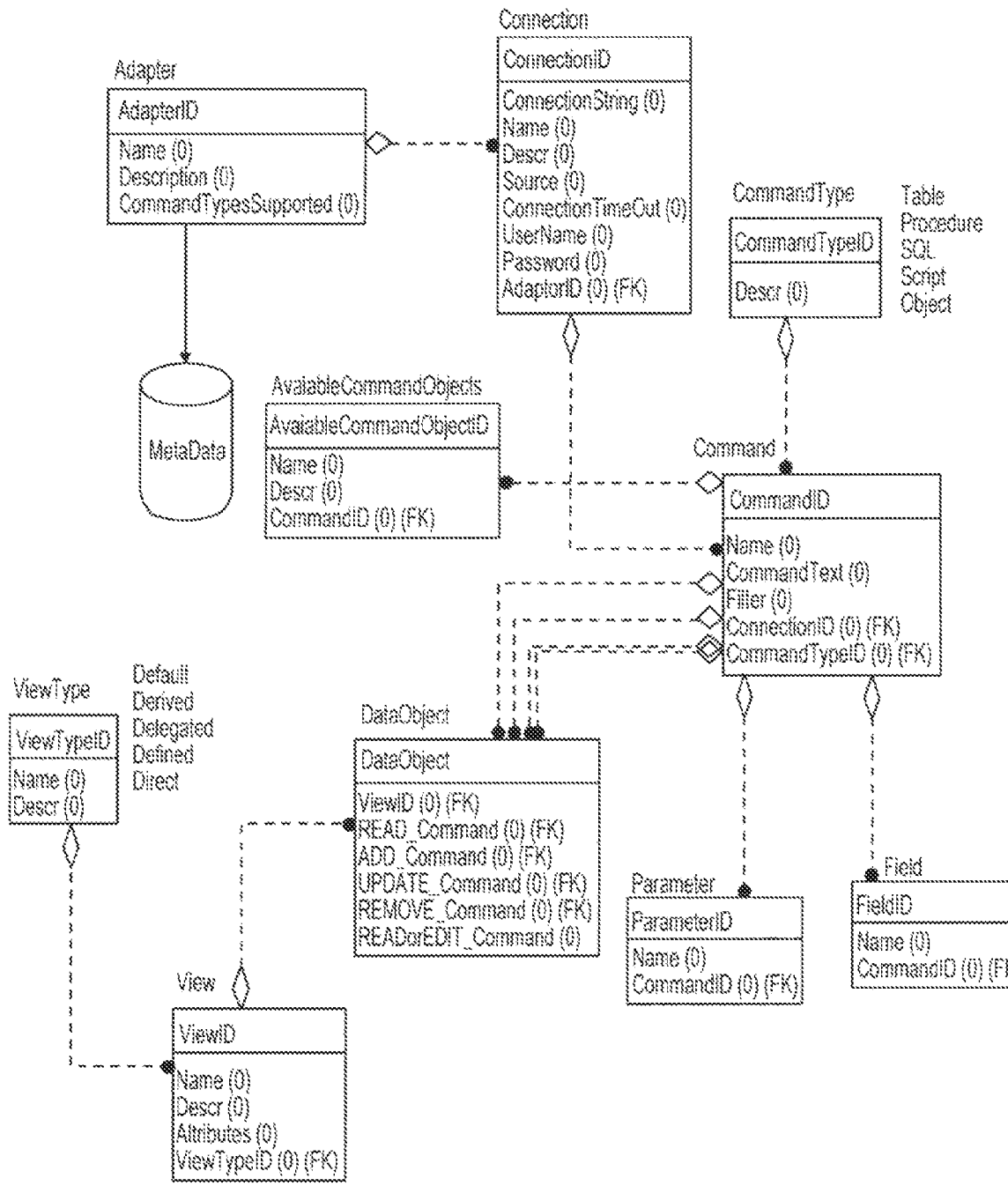
FIG. 5 shows a diagrammatic representation of the data architecture for the mobile platform illustrated in FIG. 1.

FIG. 5 shows a diagrammatic representation of the data architecture for the mobile platform illustrated in FIG. 1 and comprising an embodiment of the present invention. FIG. 5 shows that a View object of the data system has a ViewID and is bound to a defined Data Object. FIG. 5 shows that the Data Object can include one or more commands from among a READ command, an ADD command, an UPDATE command, a REMOVE command, and a READ for EDIT command.

FIG. 5 shows that Command objects also are bound to the Data Objects, and also are bound to Connection objects, which are in turn bound to Adapter objects. FIG. 5 shows that the Adapter objects interface with a metadata store that interfaces with the enterprise datasources to retrieve data for the mobile platform, as described above.

Figure 6:
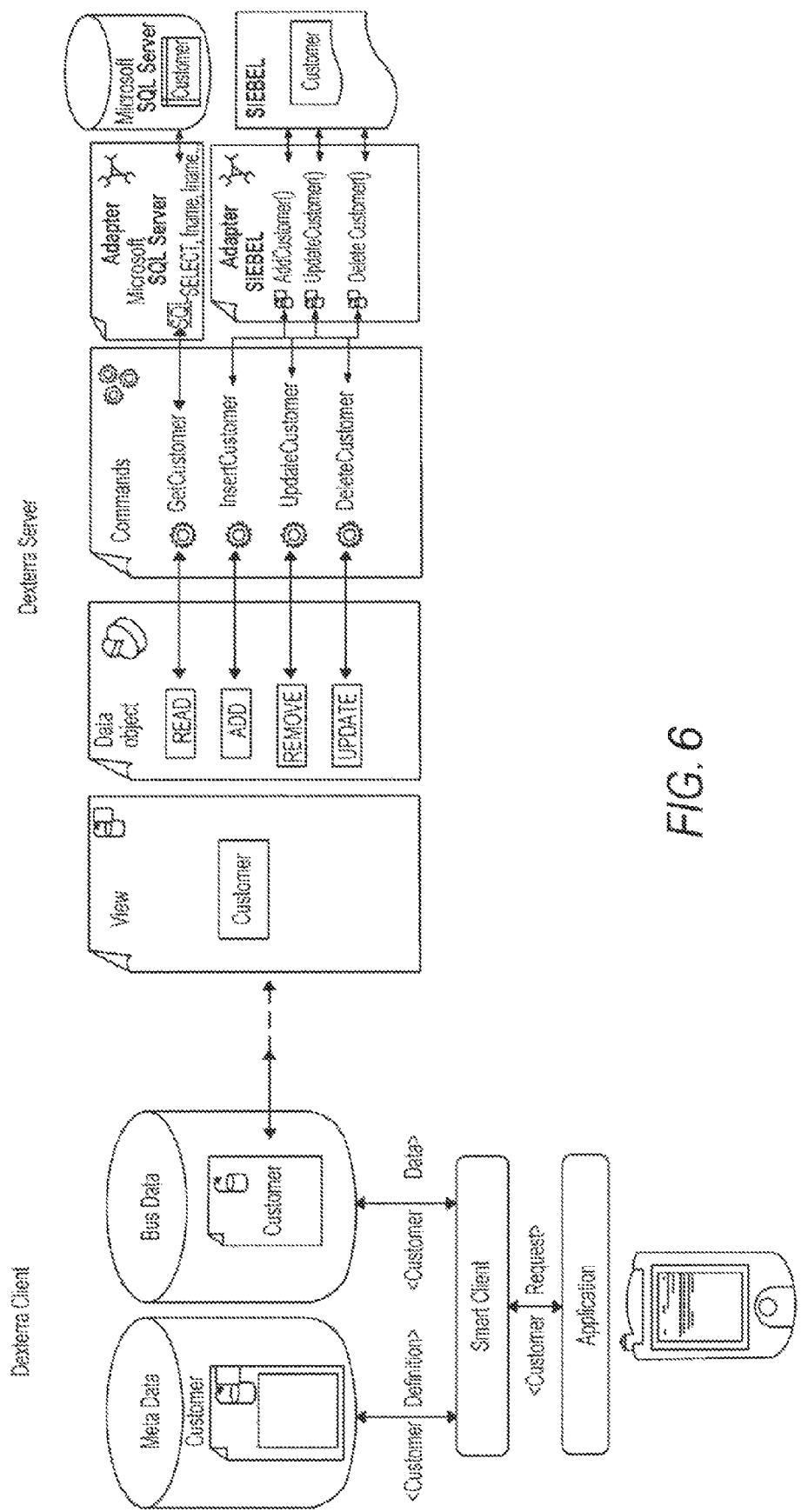
FIG. 6 is a diagrammatic representation of the data access configuration for the mobile platform constructed in accordance with the present invention.

FIG. 6 is a diagrammatic representation of the data access configuration for the mobile platform constructed in accordance with the present invention. FIG. 6 shows that a mobile client (indicated as "Dexterra Client" in FIG. 6) communicates with the application server ("Dexterra Server" in FIG. 6) through a View object at the server, where the View object interfaces with a Data Object to act through Command objects to access Adapter objects that ultimately interface directly with enterprise datastores (e.g., Microsoft SQL Server and Siebel data servers in FIG. 6). At the client device, the mobile application communicates data requests through a smart client to metadata stores and business data stores to the View objects at the application server.

Figure 7:
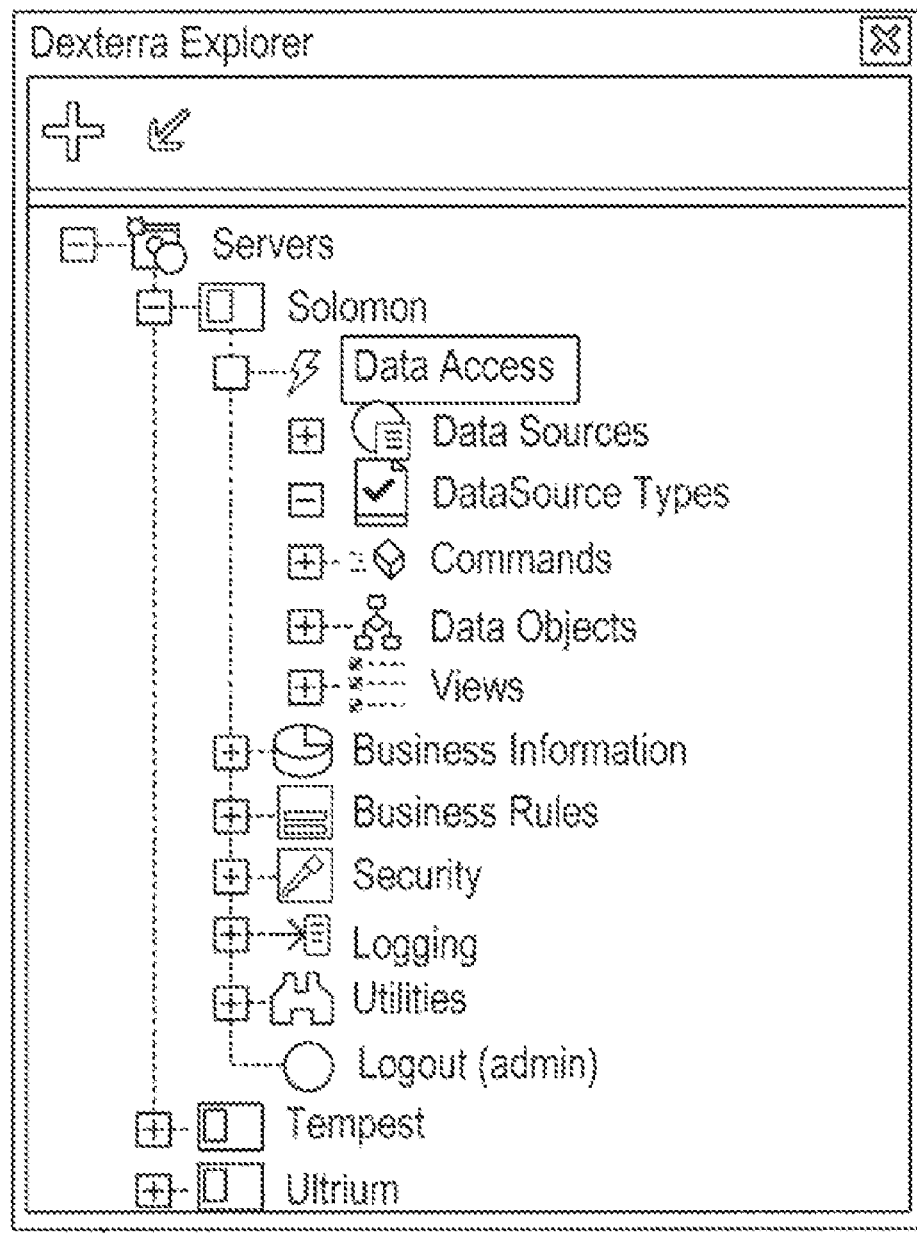
FIG. 7 is a screenshot of a display on a computer device that is hosting the DAD computer program application.

FIG. 7 illustrates how access to the DAD features of the mobile platform system is gained through a file explorer type of graphical user interface. FIG. 7 is a screenshot of a display on a computer device that is hosting the DAD computer program application. In FIG. 7, the display is a window-type display titled "Dexterra Explorer" and shows a workspace with a file tree view. The tree view shows a hierarchy of "Servers" with server names indicated as Solomon, Tempest, Ultrium, and Thunder. It should be apparent that server names may be arbitrary selected.

In accordance with the DAD program, a variety of actions can be taken with respect to a selected server. FIG. 7 shows that the Solomon server has been selected, with the Data Access menu item being highlighted to show that data access options can be investigated. Beneath the Data Access menu item, submenus are shown, comprising Data Sources, Datasource Types, Commands, Data Objects, and Views. Using the DAD program and the explorer menu, a mobile application designer can specify new datasources and can interface with corresponding Adapters to gain access to enterprise datasources for the mobile clients that will use the developed application.

Figure 8:
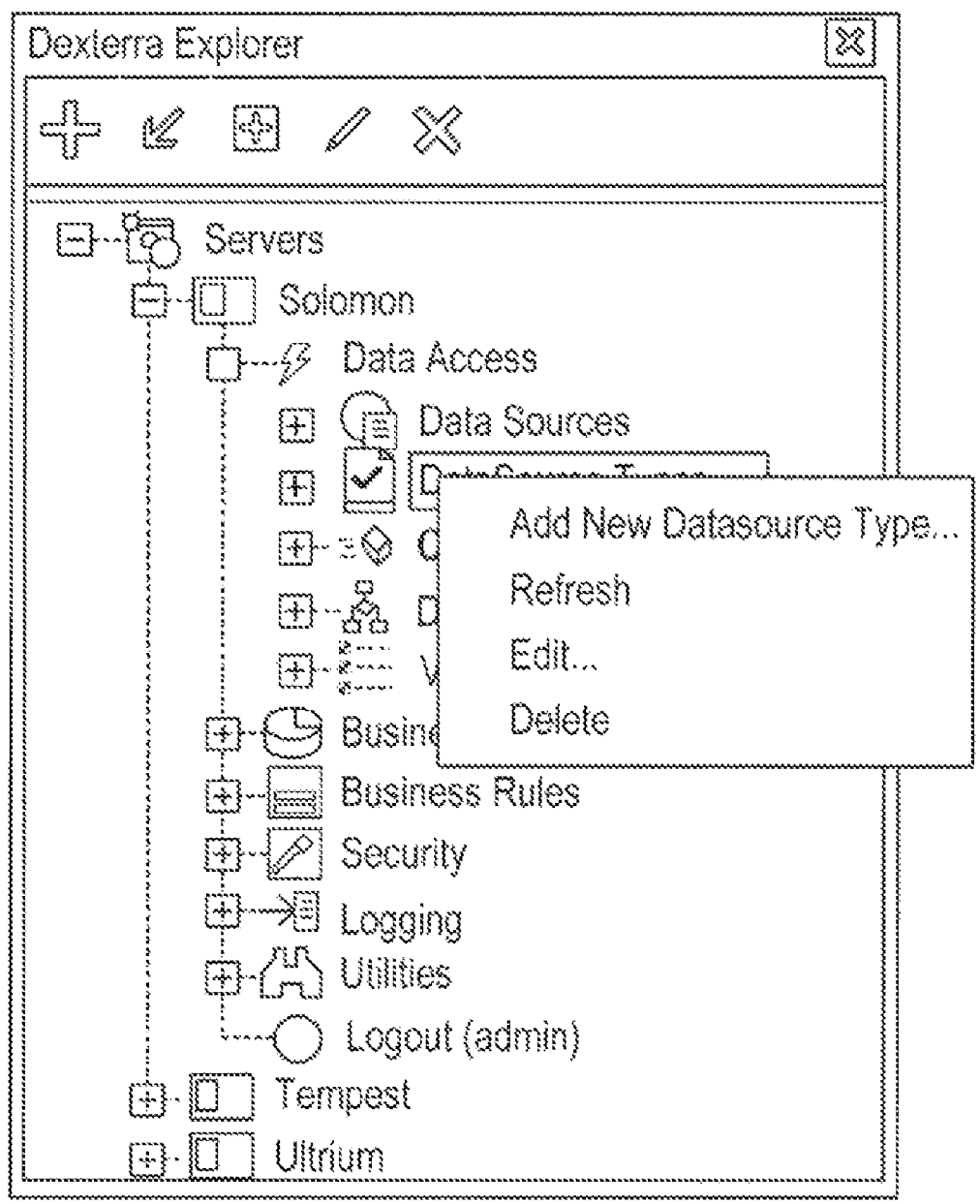
FIG. 8 shows a tree view and context menu generated by the DAD program when "Datasource Types" is selected on the Dexterra Explorer menu.
Figure 9:
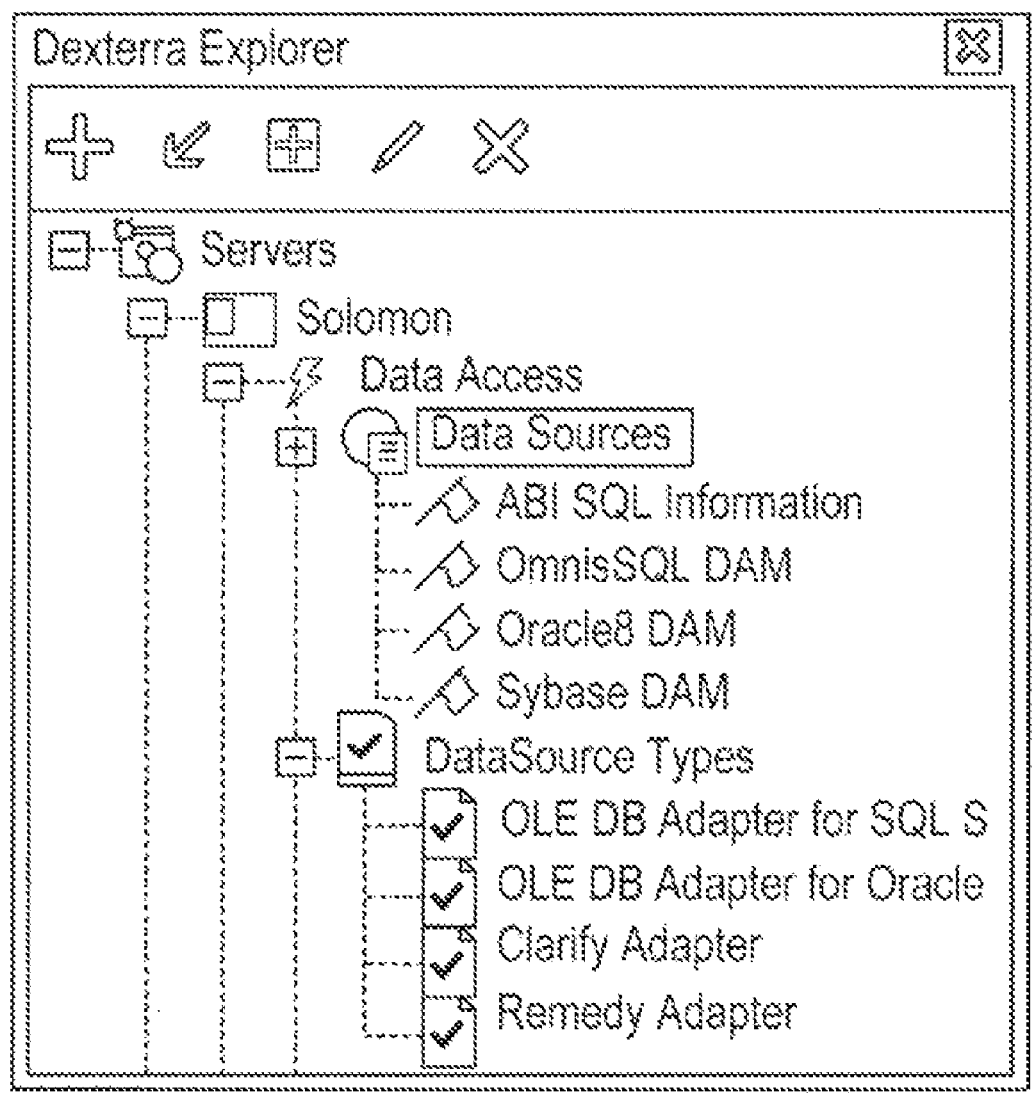
FIG. 9 shows selection of the Data Sources menu item from the FIG. 8 display.
Figure 10:
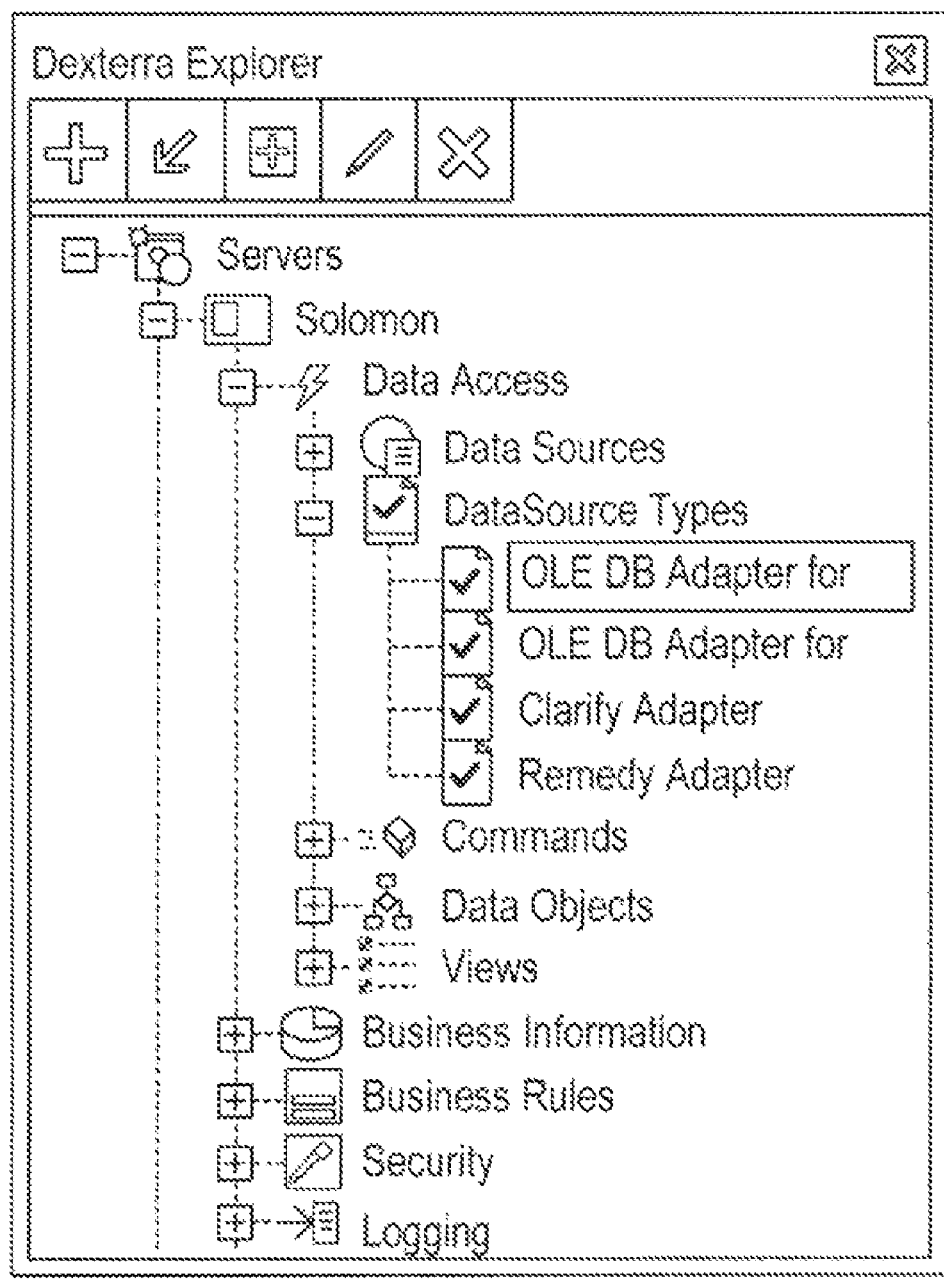
FIG. 10 shows selection of a particular datasource type, from which a context menu is generated.
Figure 11:
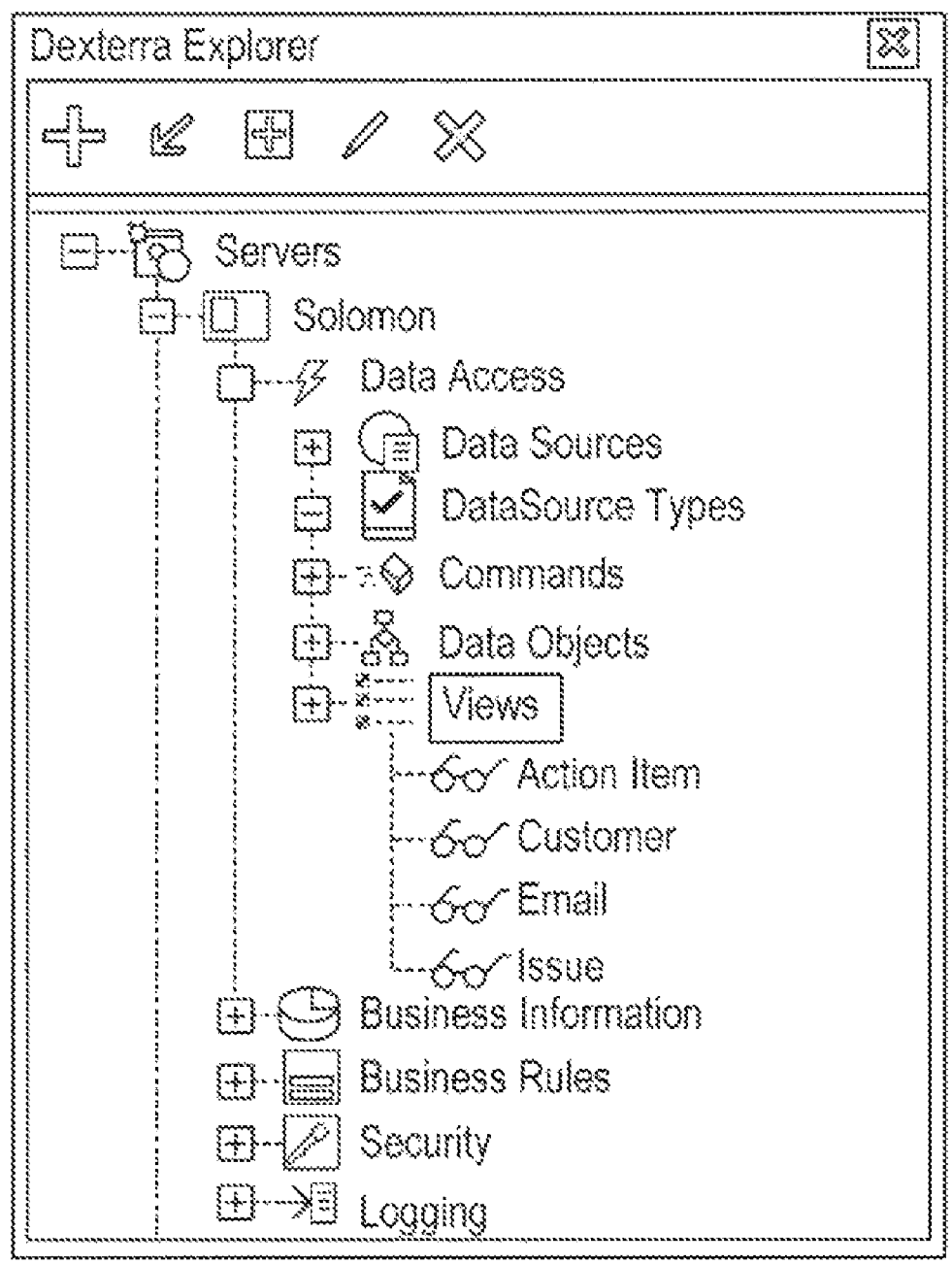
FIG. 11 shows View types that are available for selection.

FIG. 8 shows a designer having selected "Datasource Types" on the Dexterra Explorer menu and FIG. 8 shows that a context menu is generated, providing the designer with options to add a new datasource type, or refresh the view, or edit a datasource type, or delete a datasource type. Thus, selecting a Dexterra Explorer menu item can generate a context menu that provides a menu of additional operations on the selected menu item. FIG. 9 shows selection of the Data Sources menu item from FIG. 8, illustrating exemplary data sources available in the system under design. FIG. 10 shows selection of a particular datasource type, from which a context menu may be generated for editing operations on the selected datasource type. FIG. 11 shows View types that are available for selection. As with the other Dexterra Explorer menu items, selecting the View menu item will generate a context menu that allows a designer to perform editing operations on View types, including create, edit, and delete.

Figure 12:
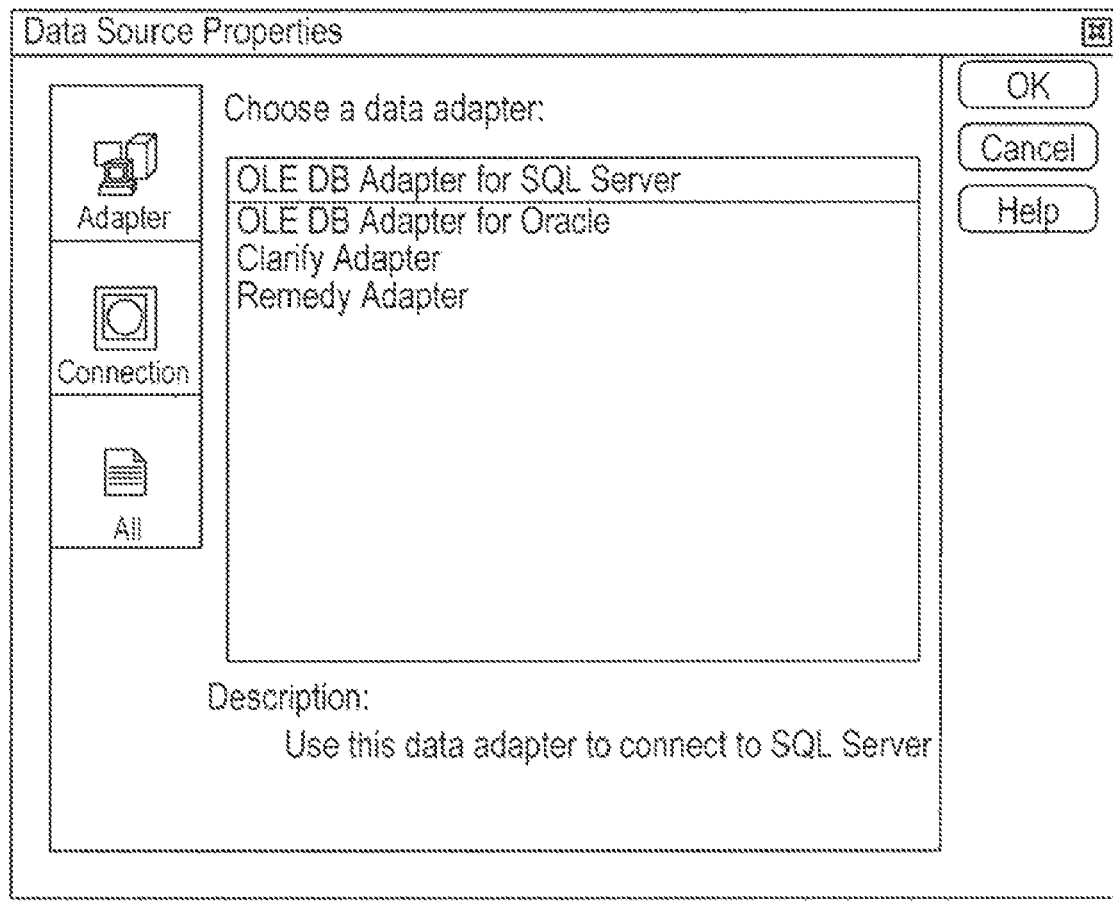
FIG. 12 shows a Data Sources Properties dialog box that is generated by utilizing a Data Sources context menu to create a new type of Data Source.

As noted above, if the "Data Sources" node on the Dexterra Explorer menu is selected, a new Data Source can be specified via a context menu that is generated. FIG. 12 shows a Data Sources Properties dialog box that is generated by utilizing a Data Sources context menu to create a new type of Data Source. FIG. 12 shows that the designer is presented with a screen that permits selection of a data adapter, based on the data types available to the designer. In FIG. 12, the available adapter types are shown as OLE DB for SQL Server, OLE DB for Oracle, Clarify Adapter, and Remedy Adapter. These adapter types are shown for purposes of illustration only; additional and different adapter types could be provided in accordance with the invention. FIG. 12 shows that the designer also can specify a Connection type. After selecting an Adapter, the designer would select the Connection display button to specify the connection parameters.

Figure 13:
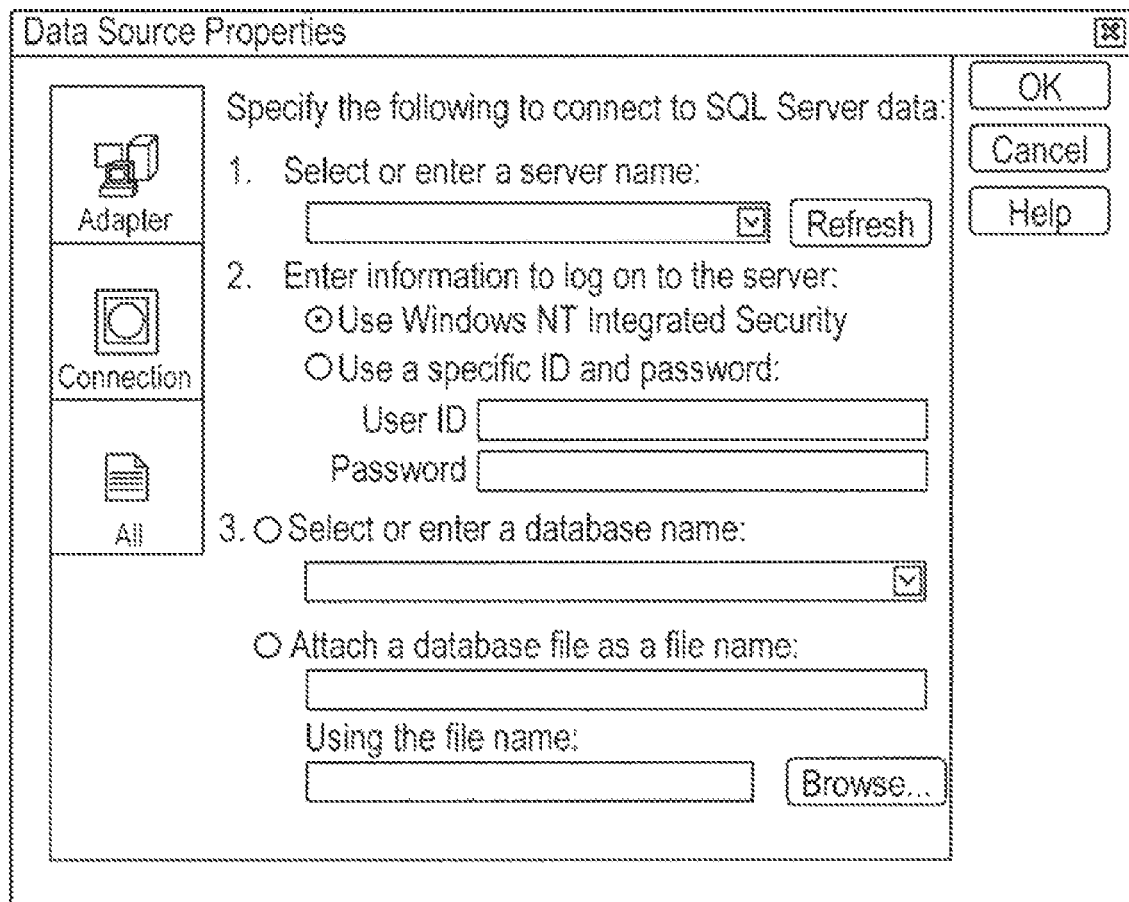
FIG. 13 shows an authentication screen for DAD login information and choose a particular enterprise datasource target.

FIG. 13 shows an authentication screen for the designer to provide login information and choose a particular enterprise datasource target. Once the designer is authorized, the display will be changed in accordance with the selected adapter. After a new datasource is defined, using the DAD interface, a new datasource type node will appear in the Dexterra Explorer tree view (FIG. 10), in accordance with the designer's newly defined datasource type.

Figure 14:
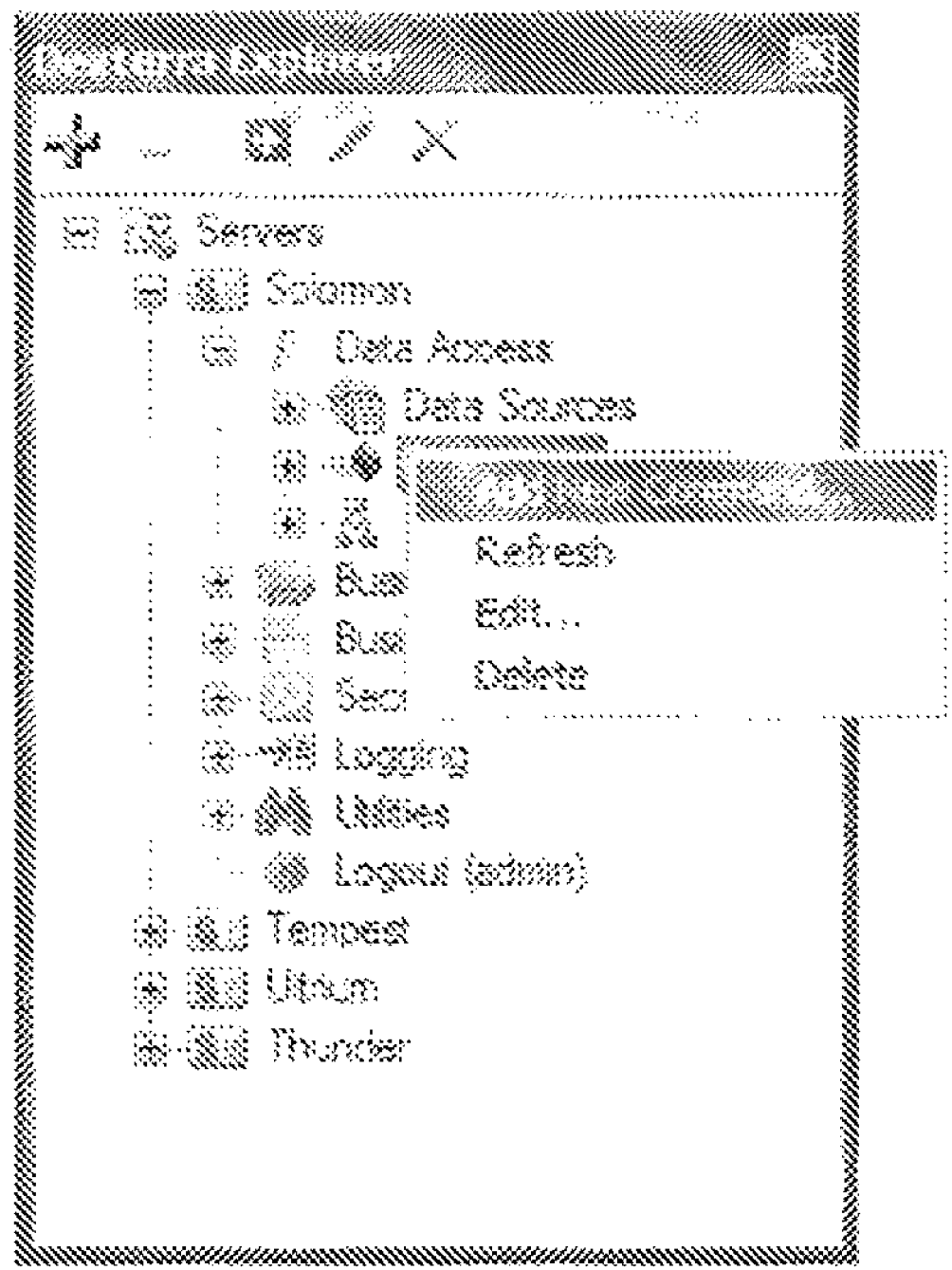
FIG. 14 shows a designer making a Command selection from the tree view.

Other nodes can be created, added, edited, and deleted from the Dexterra Explorer tree view. FIG. 14 shows a designer making a Command selection from the tree view. Selection of "Add New Command" in FIG. 14 generates the "New Command" dialog box of FIG. 15.

Figure 15:
FIG. 15 shows a "New Command" dialog box in response to selection in FIG. 14.
Figure 16:
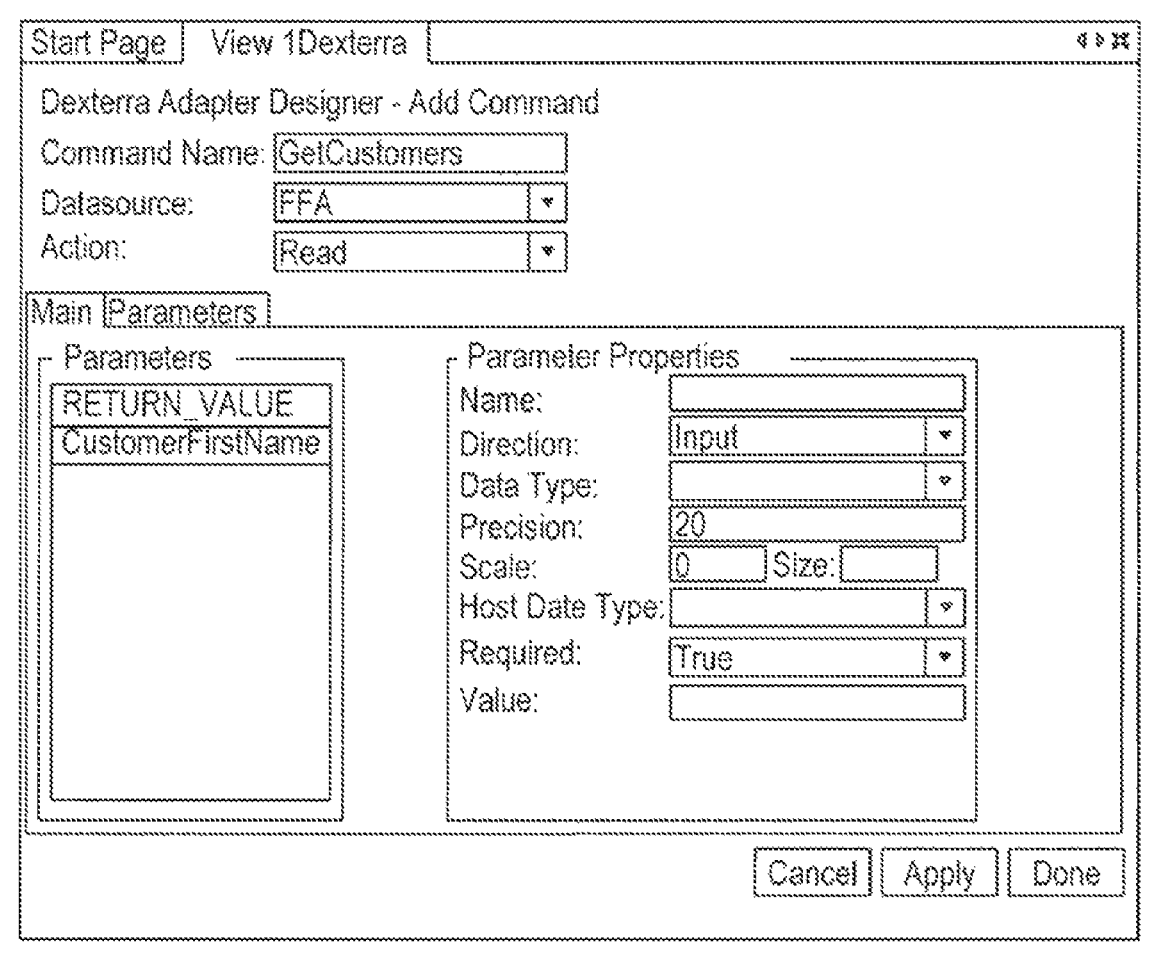

FIG. 15 shows that a name can be entered for the new command, along with parameters to specify datasource, action, data type, and source, and also space for entry of a SQL statement. FIG. 16 shows that the Parameters tab of the Add Command dialog accepts additional command specifications.

Among the control parameters for the Add New Command dialog box of FIG. 15 are:

Command Name Textbox—The DAD user enters a name to uniquely identify the command. On "save" there is a validation that the Command Name is unique.

Datasourse—This is a drop-down list of datasources that have been defined. This information is discovered from metadata. Every command is required to have a corresponding datasource.

Command Type (Action)—This is a drop-down list of the different types of commands available. Every command is required to have a command type.

Data Group box—This group box includes tabs for "Main" and "Parameters", and contains the controls to define the actions of the command. This box will be different depending on the chosen datasource. For example, the illustrated display in FIG. 15 is for a RDBMS such as SQL Server. Those skilled in the art will appreciate that a system such as an Oracle/Siebel system probably would not have the "SQL Statement" text box.

Source Type radio button—Selecting this radio button enables the two corresponding combo boxes (Datasource and Source Type) and disables the SQL Statement textbox. This radio button indicates the designer is using the enterprise objects available by the enterprise data system.

Source Type box—is a list indicating the types of Enterprise Objects available from the enterprise system. An example of source types includes tables, views, or stored procedures in SQL.

Source box—a drop-down list of the available enterprise objects for the user to select based on the filtering by type.

SQL Statement radio button—Selecting this radio button enables the corresponding textbox and disables the Source-Type and Source combo boxes. This radio button indicates the designer is going to specify the SQL Statement that this command shall execute.

SQL Statement text box—The designer enters a SQL statement to be executed by the command.

Among the parameters for the Add New Command—Parameters dialog box of FIG. 16 are:

Parameters list box—Contains a list of parameters for the selected Enterprise Object, if they pertain. FIG. 16 shows parameters of Return Value and CustomerFirstName.

Parameter Properties group box—shows a grouping of controls that describe the properties of the selected parameter.

Name text box—The name of the selected parameter. In FIG. 16, this textbox is grayed out to indicate it is disabled because the parameter name cannot be edited.

Direction box—This contains a drop-down list of the direction types a parameter can have, such as Input, Output, and Input/Output.

Data Type box—This contains a drop-down list of the datatypes available for the parameter, if applicable.

Required box—Contains the Boolean values True or False and thereby indicates whether or not the parameter is required.

Value text box—This text box is available if a value for the parameter is to be forced.

Figure 17:
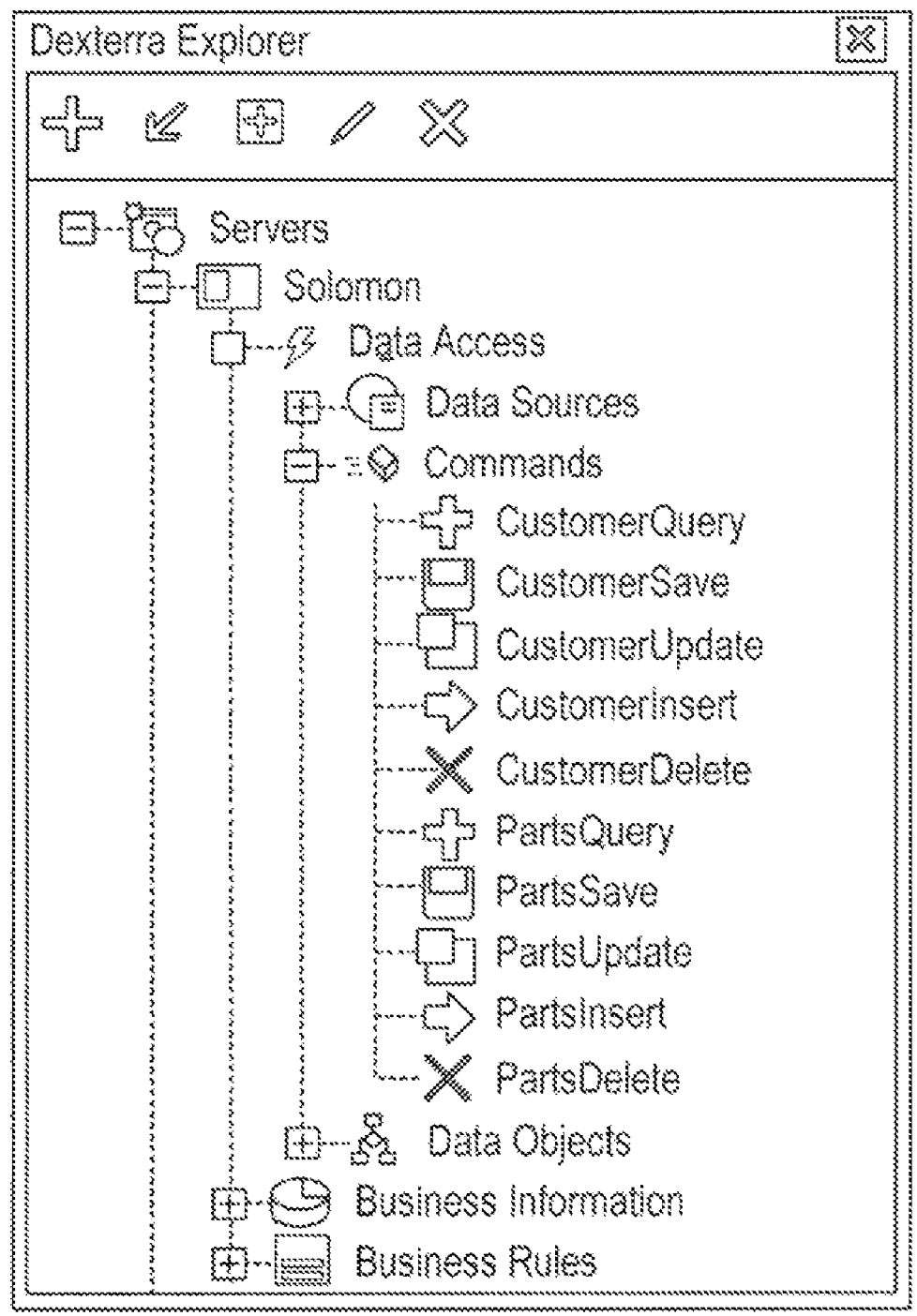
FIG. 17 shows the tree view with a new Command called "CustomerQuery" that has been added.

After the editing process is completed, the tree view in the Dexterra Explorer will be updated to reflect any added items. For example, FIG. 17 shows that a new Command called "CustomerQuery" has been added to the tree view. Thus, the name command will be available to any subsequent developer who uses DAD to interface to the Solomon server. It should be noted that the new CustomerQuery command also could be manipulated (copied, moved, edited and moved, etc.) to another node of the tree view, using the Dexterra Explorer graphical user interface and editing commands.

Thus, the Dexterra Explorer tool provides the ability to create custom enterprise connectivity to disparate backend datasources, and provides the ability to separate the connectivity to any backend enterprise system with the configuration and adaptation to the specific instance of an implementation. This allows the communications between the .NET interface and a backend system to be developed separately from the configuration of the information required from the backend system, thus creating an abstraction layer and allowing for a configuration tool to manage the adaptation, as described herein. In this way, the disclosed tool implements a specific Dexterra Adapter Interface that will bind to the Dexterra DataManager and enforce specific inputs and outputs required in moving data between the Dexterra Server and any of the enterprise datasources.

Figure 18:
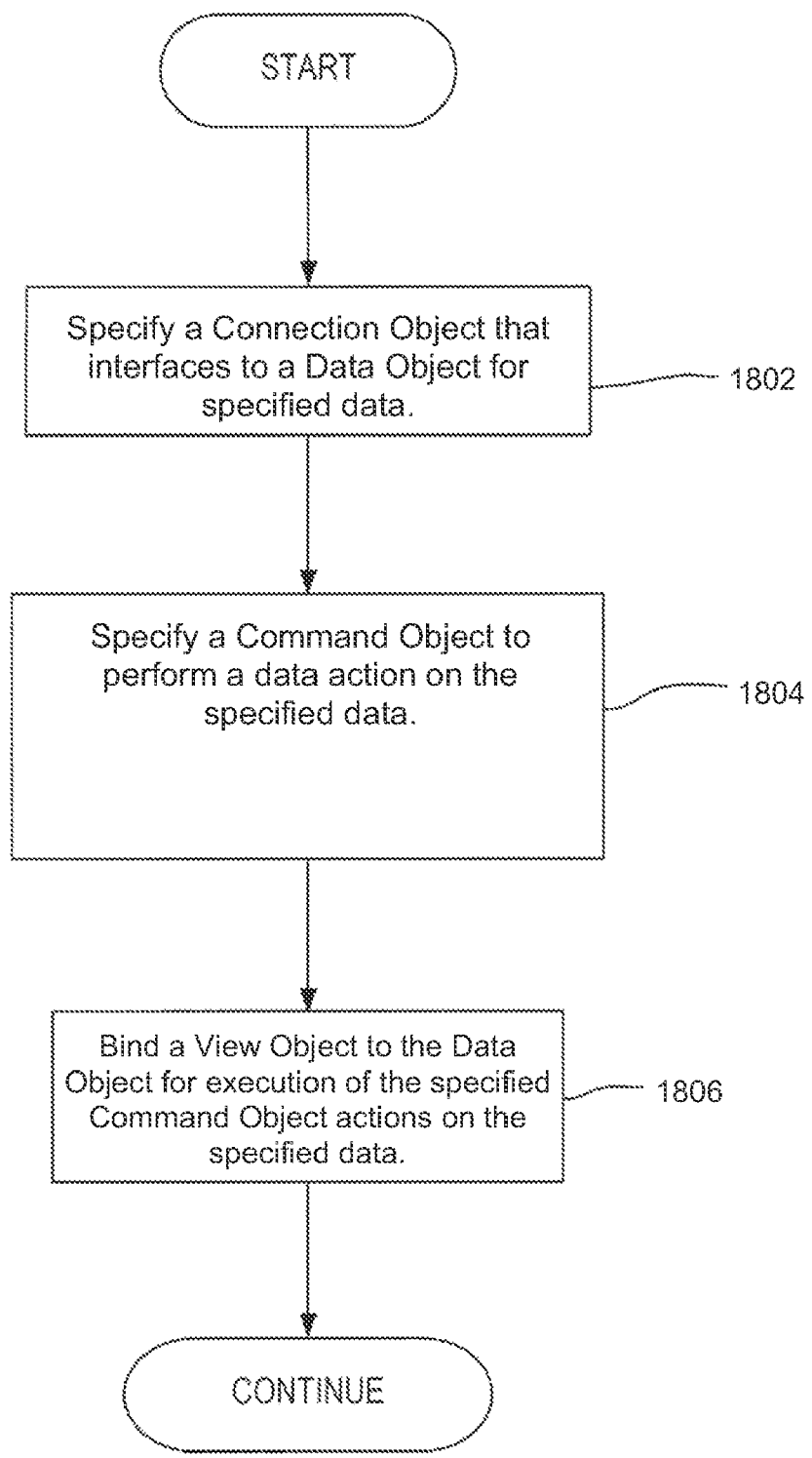
FIG. 18 is a flow diagram that illustrates processing of the mobile platform system in accordance with the invention.

FIG. 18 is a flow diagram that illustrates operation of the mobile data platform system as described above. In the first operation, represented in the drawing as flow diagram box 1802, a user specifies (or creates) a Connection Object that provides an interface to data objects stored at a back end enterprise datasource and exposes a data interface object available through the Connection Object as any one of either a Table, Stored Procedure, Script, or Object. In the next operation, at box 1804, a data action is determined wherein the data action is to be performed on the data interface object, wherein the data action is specified by a Data Object that identifies the data action according to a Command Object. At the last operation, box 1806, a View Object is bound to the Data Object for execution of the specified Command Object data actions on the data interface object.

As described above, using the Dexterra tool, a system designer will create a Connection Object to a back end enterprise datasource using a Dexterra-supported Adapter. The Connection Object will expose (either using discovery and intraspection or by description) the data interface object(s) that are available through the Adapter as either a Table, Stored Procedure, Script or Object. Next, using the Dexterra tool, a designer will create a series of Command Objects that perform specific actions through an Adapter. The actions can include operations such as Select, Insert, Update, and/or Delete. A designer then defines a Data Object in which they will select the appropriate Select Command, Insert Command, Update Command, and/or Delete Command. A View Object is then bound to the Data Object for its request and respond actions. Using this technique, a developer can request and persist data from one or more back end datasources mapped to a single defined data object within the Dexterra Application Server, thus providing a layer of abstraction to the physical data structure and interface capabilities.

When the mobile platform operates in response to a mobile client, the Data Manager of the Application Server will request and respond to any Connector Interface component of the system. The Application Server uses the definition of the Connection, Command, Data, and View objects to determine how and what data to retrieve or persist to a back end enterprise datasource.

In accordance with the invention, a computer program tool referred to as "DAD" for use by designers of mobile applications is provided to create custom enterprise connectivity to disparate enterprise datasources of the mobile data platform system. The DAD application program tool provides these features through the user interface illustrated in the drawings. Thus, the DAD application program tool provides a means for specifying application processing of data that is shared between the multiple enterprise datasources and mobile clients. As described above, the DAD application program provides a means for specifying a Connection Object that provides an interface to data objects stored at a back end enterprise data source and exposes a data interface object available through the Connection Object as any one of either a Table, Stored Procedure, Script, or an Object, means for specifying a Command Object that performs specific data actions, means for specifying a Data Object that permits a mobile data client to specify one of the Command Object data actions to be performed on the data interface object, and means for specifying a View Object that is adapted to be bound to the Data Object for execution of the specified Command Object data actions.

The computer program comprising the DAD tool can be installed on a computer apparatus or system, such as a desktop computer, notebook computer, or the like, so long as the DAD tool program can receive user input to carry out the connection adapter specifying process and can verify datasources, bindings, and the like. The configured adapters and Connection Objects can be included within a mobile data platform system and installed at an application server of the mobile platform such as described above, so that the operational features of the adapters can be utilized at the mobile clients for operations with the enterprise datasources.

The present invention has been described above in terms of a presently preferred embodiment so that an understanding of the present invention can be conveyed. There are, however, many configurations for mobile enterprise data systems not specifically described herein but with which the present invention is applicable. The present invention should therefore not be seen as limited to the particular embodiments described herein, but rather, it should be understood that the present invention has wide applicability with respect to mobile enterprise data systems generally. All modifications, variations, or equivalent arrangements and implementations that are within the scope of the attached claims should therefore be considered within the scope of the invention.

We claim:

1. A method of specifying application processing of data that is shared between multiple enterprise datasources and a mobile client, the method comprising:

specifying a Connection Object that provides an interface to data objects stored at a back end enterprise datasource and exposes a data interface object available through the Connection Object as any one of either a Table, Stored Procedure, Script, or Object;

determining a data action to be performed on the data interface object, wherein the data action is specified by a Data Object that identifies the data action according to a Command Object; and binding a View Object to the Data Object for execution of the specified Command Object data actions on the data interface object.

2. A method as defined in claim 1, wherein the Command Object can specify a data action comprising any one of a data Select, Insert, Update, and Delete action.

3. A method as defined in claim 1, wherein specifying the Connection Object comprises selecting from among a plurality of adapters, each of which is adapted to communicate with a disparate enterprise datasource.

4. A computer program system for specifying application processing of data that is shared between multiple enterprise data sources and a mobile client, the system comprising:

means for specifying a Connection Object that provides an interface to data objects stored at a back end enterprise data source and exposes a data interface object available through the Connection Object as any one of either a Table, Stored Procedure, Script, or an Object;

means for specifying a Command Object that performs specific data actions;

means for specifying a Data Object that permits a mobile data client to specify one of the Command Object data actions to be performed on the data interface object; and means for specifying a View Object that is adapted to be bound to the Data Object for execution of the specified Command Object data actions.

5. A system as defined in claim 4, wherein the Command Object can specify a data action comprising any one of a data Select, Insert, Update, and Delete action.

6. A system as defined in claim 4, wherein the specified Connection Object is selected from among a plurality of adapters, each of which is adapted to communicate with a disparate enterprise datasource.

7. A computer program system for specifying application processing of data that is shared between multiple enterprise datasources and a mobile client, the system comprising:

a processor that communicates with the mobile client and interfaces with the enterprise datasources through an application server;

a designer tool application that designates a Connection Object that provides an interface to data objects stored at one of the enterprise datasources and exposes a data interface object available through the Connection Object as any one of either a Table, Stored Procedure, Script, or an Object, designates a Command Object that performs specific data actions, designates a Data Object that permits a mobile data client to specify one of the Command Object data actions to be performed on the data interface object, and designates a View Object that is adapted to be bound to the Data Object for execution of the specified Command Object data actions, wherein the Command Object can specify a data action comprising any one of a data Select, Insert, Update, and Delete action and wherein the Connection Object is selected from among a plurality of adapter objects, each of which is adapted to communicate with a disparate enterprise datasource.

* * * * *